US009097434B2

(12) United States Patent
Yabu et al.

(10) Patent No.: US 9,097,434 B2
(45) Date of Patent: Aug. 4, 2015

(54) TARGET SUPPLY APPARATUS AND TARGET SUPPLY METHOD

(71) Applicant: Gigaphoton Inc., Oyama-shi, Tochigi (JP)

(72) Inventors: Takayuki Yabu, Oyama (JP); Osamu Wakabayashi, Oyama (JP)

(73) Assignee: GIGAPHOTON INC., Tochigi (JP)

( * ) Notice: Subject to any disclaimer, the term of this patent is extended or adjusted under 35 U.S.C. 154(b) by 137 days.

(21) Appl. No.: 13/753,324

(22) Filed: Jan. 29, 2013

(65) Prior Publication Data

US 2013/0209077 A1 Aug. 15, 2013

(30) Foreign Application Priority Data

Feb. 10, 2012 (JP) ................................ 2012-027609
Oct. 22, 2012 (JP) ................................ 2012-232890

(51) Int. Cl.
*A21B 2/00* (2006.01)
*F26B 19/00* (2006.01)
*F24H 1/00* (2006.01)
*H05G 2/00* (2006.01)

(52) U.S. Cl.
CPC ............ *F24H 1/0018* (2013.01); *H05G 2/005* (2013.01); *H05G 2/006* (2013.01); *H05G 2/008* (2013.01)

(58) Field of Classification Search
None
See application file for complete search history.

(56) References Cited

U.S. PATENT DOCUMENTS

| | | | |
|---|---|---|---|
| 7,122,816 | B2 | 10/2006 | Algots et al. |
| 7,405,416 | B2 | 7/2008 | Algots et al. |
| 7,449,703 | B2 | 11/2008 | Bykanov |
| 2010/0143202 | A1 | 6/2010 | Yabu et al. |
| 2011/0310365 | A1 | 12/2011 | Yabu et al. |

FOREIGN PATENT DOCUMENTS

JP 2005-032510 A 2/2005

*Primary Examiner* — Thor Campbell
(74) *Attorney, Agent, or Firm* — McDermott Will & Emery LLP

(57) ABSTRACT

A target supply apparatus used in an extreme ultraviolet light apparatus that generates extreme ultraviolet light by irradiating a target with a laser beam may include a tank, a nozzle that includes a through-hole and is disposed so that the through-hole communicates with the interior of the tank, a first heater disposed along a wall of the tank, a second heater disposed along a wall of the tank in a position that is further from the nozzle than the first heater, and a control unit configured to control the first heater and the second heater so that a temperature of the first heater is greater than a temperature of the second heater.

14 Claims, 16 Drawing Sheets

TARGET SUPPLY APPARATUS AND TARGET SUPPLY METHOD

CROSS-REFERENCE TO RELATED APPLICATIONS

The present application claims priority to Japanese Patent Application No. 2012-027609, filed Feb. 10, 2012, and to Japanese Patent Application No. 2012-232890, filed Oct. 22, 2012.

BACKGROUND

1. Technical Field

The present disclosure relates to target supply apparatuses and target supply methods.

2. Related Art

With recent refinement in semiconductor processes, the reduction in sizes of transfer patterns in photolithography for semiconductor processes is proceeding swiftly. In next-generation processes, there will be demand for microprocessing on the scale of 70 nm to 45 nm, and even on the scale of 32 nm and below. Accordingly, the development of exposure apparatuses that combine an apparatus for generating EUV light at a wavelength of approximately 13 nm with a reduced-projection reflective optical arrangement is expected to meet, for example, the demand for microprocessing on scale of 32 nm and below.

Three types of EUV light generation apparatuses that generate plasma are generally known, which include Laser Produced Plasma (LPP) apparatuses that employ plasma generated by irradiating a target material with a laser beam, Discharge Produced Plasma (DPP) apparatuses that employ plasma generated through electric discharge, and Synchrotron Radiation (SR) apparatuses that employ orbital radiation to generate plasma.

SUMMARY

A target supply apparatus according to an aspect of the present disclosure may include a tank, a nozzle that includes a through-hole and that is disposed so that the through-hole communicates with an interior of the tank, a first heater disposed along a wall of the tank, a second heater disposed along a wall of the tank in a position that is further from the nozzle than the first heater, and a control unit configured to control the first heater and the second heater so that a temperature of the first heater is greater than a temperature of the second heater.

A target supply apparatus according to another aspect of the present disclosure may include a tank, a nozzle that includes a through-hole and that is disposed so that the through-hole communicates with an interior of the tank, a heater disposed along a wall of the tank, a low heating unit provided in a position within the tank that is distanced from an inner wall of the tank, and a control unit configured to control at least the heater and the low heating unit so that a temperature of at least the heater is greater than a temperature of the low heating unit. The term "low heating" in the present specification refers to a heating temperature which is lower than any of the other heaters discussed in the specification.

A target supply method according to an aspect of the present disclosure uses a target supply apparatus having a tank, a nozzle that includes a through-hole and that is disposed so that the through-hole communicates with the interior of the tank, a first heater disposed along a wall of the tank, a second heater disposed along a wall of the tank in a position that is further from the nozzle than the first heater, and a control unit configured to control the first heater and the second heater so that a temperature of the first heater is greater than a temperature of the second heater, and the method may include any of a step of melting a target material by controlling the first heater and the second heater such that the temperature of the first heater is higher than the temperature of the second heater, a step of holding a temperature of the target material within a predetermined temperature range by controlling the first heater and the second heater such that the temperature of the first heater is higher than the temperature of the second heater, and a step of hardening the target material by controlling the first heater and the second heater such that the temperature of the first heater is higher than the temperature of the second heater.

A target supply method according to another aspect of the present disclosure uses a target supply apparatus having a tank, a nozzle that includes a through-hole and that is disposed so that the through-hole communicates with the interior of the tank, a heater disposed along a wall of the tank, a low heating unit provided in a position within the tank that is distanced from an inner wall of the tank, and a control unit configured to control at least the heater and the low heating unit so that a temperature of the heater is greater than a temperature of the low heating unit, and the method may include any of a step of melting a target material by controlling the heater and the low heating unit such that the temperature of the heater is higher than the temperature of the low heating unit, a step of holding a temperature of the target material within a predetermined temperature range by controlling the heater and the low heating unit such that the temperature of the heater is higher than the temperature of the low heating unit, and a step of hardening the target material by controlling the heater and the low heating unit such that the temperature of the heater is higher than the temperature of the low heating unit.

BRIEF DESCRIPTION OF THE DRAWINGS

Exemplary embodiments of the present disclosure will be described hereinafter with reference to the appended drawings.

DETAILED DESCRIPTION

Contents

Figure 1:
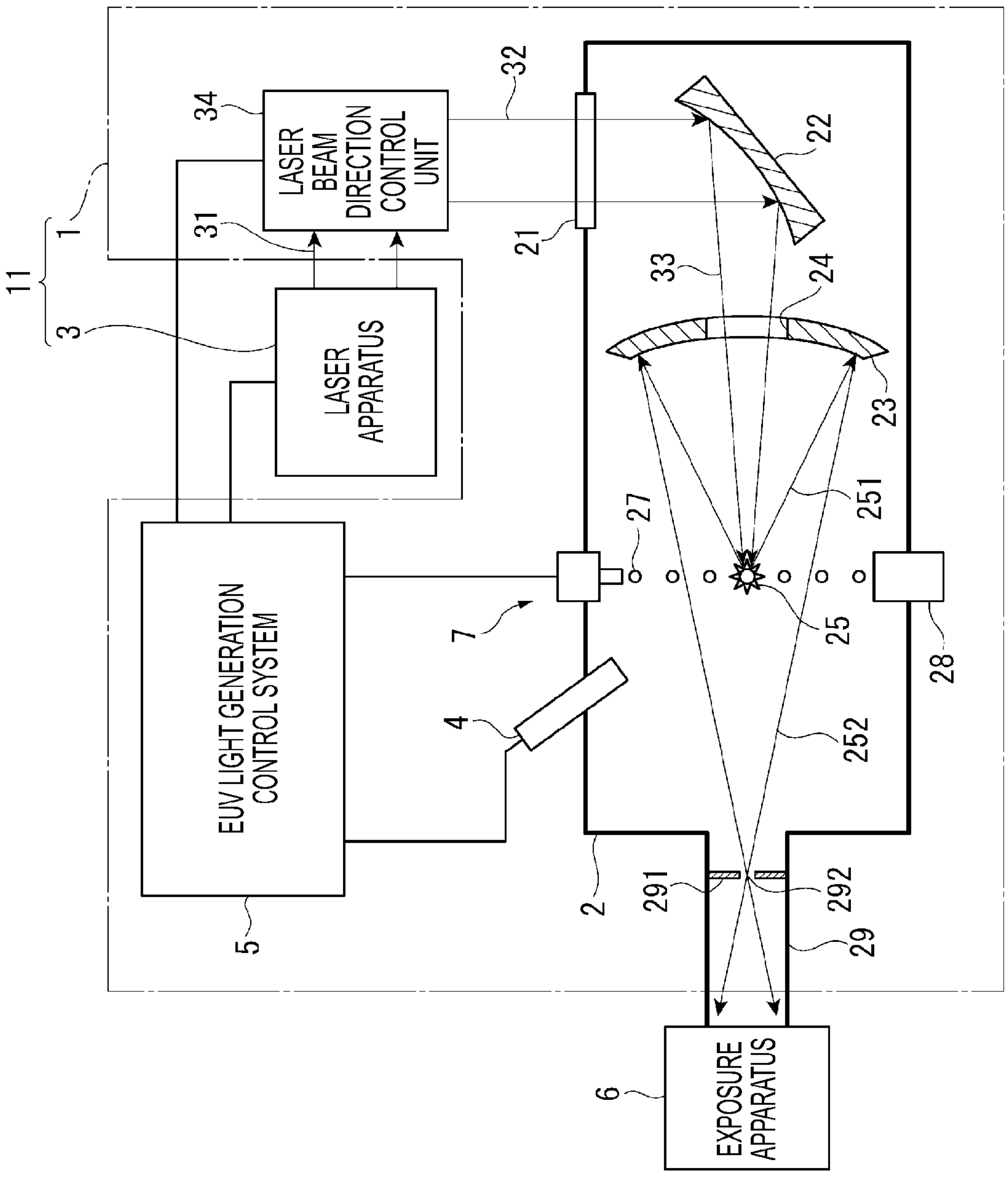
FIG. 1 illustrates the overall configuration of an exemplary LPP-type EUV light generation apparatus.

1. Overview
2. Overall Description of EUV Light Generation Apparatus
2.1 Configuration
2.2 Operation
3. EUV Light Generation Apparatus Including Target Supply Apparatus
3.1. Terms
3.2 First Embodiment
3.2.1 Overview
3.2.2 Configuration
3.2.3 Solubility of Oxygen Atoms in Tin
3.2.4 Operation
3.3 Second Embodiment
3.3.1 Overview
3.3.2 Configuration
3.3.3 Operation
3.4 Third Embodiment
3.4.1 Overview
3.4.2 Configuration
3.4.3 Operation
3.5 Fourth Embodiment
3.5.1 Overview
3.5.2 Configuration
3.5.3 Operation
3.6 Fifth Embodiment
3.6.1 Overview
3.6.2 Configuration
3.6.3 Operation Embodiments of the present disclosure will be described in detail hereinafter with reference to the drawings. The embodiments described hereinafter indicate several examples of the present disclosure, and are not intended to limit the content of the present disclosure. Furthermore, not all of the configurations and operations described in the embodiments are required configurations and operations in the present disclosure. Note that identical constituent elements will be given identical reference numerals, and redundant descriptions thereof will be omitted.

1. Overview

In an embodiment of the present disclosure, a target supply apparatus may include a target generator, a plurality of heaters, and a control unit. The target generator may include a tank for holding a target material and a nozzle for outputting the target material held in the tank into a chamber. The plurality of heaters may include a first heater disposed along a wall of the tank and a second heater disposed along a wall of the tank in a position that is further from the nozzle than the first heater. The control unit may control the first heater and the second heater so that the temperature of the first heater is greater than the temperature of the second heater.

Here, oxygen atoms may be dissolved within the target material held in the target generator. The solubility of the oxygen atoms within the target material may be lower as the temperature of the target material drops. For this reason, a phenomenon such as that described hereinafter may occur.

That is, with a target material that has been melted by being heated to a predetermined temperature, alternatively called a “first melting temperature” hereinafter, an amount, alternatively called a “first dissolving amount” hereinafter, of oxygen atoms that corresponds to the first melting temperature may be dissolved into the target material. When the temperature of the target material drops, the target material may harden while still containing the first dissolving amount of oxygen atoms. When the target material is then melted at a second melting temperature, which is lower than the first melting temperature, for use in the generation of EUV light, an amount, alternatively called a “second dissolving amount” hereinafter, of oxygen atoms that corresponds to the second melting temperature may be dissolved into the melted target material. As described above, the solubility of oxygen atoms drops as the temperature of the target material decreases, and thus the second dissolving amount may be lower than the first dissolving amount. Accordingly, an amount of oxygen atoms obtained by subtracting the second dissolving amount from the first dissolving amount may be incapable of being dissolved into the target material that has been melted at the second melting temperature. As a result, the oxygen atoms that cannot be dissolved may couple to the target material, resulting in the separation of oxidants from the target material. The separated oxidants may clog a nozzle hole in the nozzle. The output direction of the target material may also change if the separated oxidants accumulate in the nozzle hole.

A target supply apparatus according to an embodiment of the present disclosure may control the first heater and the second heater so that the temperature of the target material within the target generator is higher toward the leading end of the nozzle than at the other end of the nozzle. According to such a configuration, the separation of oxidants from the target material near the nozzle may be suppressed more than at a position toward the upper end of the tank in the target generator. In other words, the separation of oxidants from the target material may be appropriately controlled. Accordingly, the likelihood that the nozzle hole will be clogged by oxidants may be reduced. Further still, the likelihood that oxidants will accumulate in the nozzle hole may be reduced, and as a result, changes in the output direction of the target material may be suppressed.

In an embodiment of the present disclosure, the target supply apparatus may include the target generator, the first heater, the low heating unit, and the control unit. The target generator may include a cylindrical tank capable of holding a target material, and may output the target material into a chamber. The first heater may be disposed along a wall of the tank. The low heating unit may be provided in a position within the tank that is distanced from an inner wall of the tank, and may slightly heat the target material within the target generator. The control unit may control the first heater and the low heating unit so that the temperature of the first heater is greater than the temperature of the low heating unit.

Here, as described above, when the temperature of the target material drops, the amount of oxygen atoms that cannot be dissolved into the target material may result in the separation of oxidants from the target material. When the temperature of the target material drops and the target material hardens, such as in the case where the output of the target material is stopped, the temperature at the interface between the inner wall of the target generator and the target material may be lower for a longer amount of time than at other areas, such as the center of the target generator. Accordingly, target material oxidants may build up on the inner walls of the target generator.

In a target supply apparatus according to an embodiment of the present disclosure, the first heater and the low heating unit may be controlled while the target material is melting, so that the temperature of the first heater is greater than the temperature of the low heating unit, or in other words, so that the temperature of the target material within the target generator becomes lower toward the center of the target generator than toward the inner walls of the target generator. According to such a configuration, the buildup of oxidants from the target material on the inner walls of the target generator may be suppressed more than in the vicinity of the low heating unit.

2. Overall Description of EUV Light Generation Apparatus

2.1 Configuration

FIG. 1 illustrates the overall configuration of an exemplary LPP-type EUV light generation apparatus 1. The EUV light generation apparatus 1 may be used along with at least one laser apparatus 3. A system including the EUV light generation apparatus 1 and the laser apparatus 3 will be referred to as an EUV light generation system 11 hereinafter. As is described in detail with reference to FIG. 1, the EUV light generation apparatus 1 may include a chamber 2. The chamber 2 may be capable of being sealed. The EUV light generation apparatus 1 may further include a target supply apparatus 7. The target supply apparatus 7 may, for example, be attached to the chamber 2. A target material supplied from the target supply apparatus 7 may include tin, terbium, gadolinium, lithium, xenon, a combination of two or more of these elements, or the like, but is not limited thereto.

At least one through-hole may be provided in a wall of the chamber 2. A pulsed laser beam 32 outputted from the laser apparatus 3 may pass through that through-hole. Alternatively, at least one window 21 through which the pulsed laser beam 32 outputted from the laser apparatus 3 is transmitted may be provided in the chamber 2. An EUV collector mirror 23 having, for example, a reflective surface that has a spheroidal shape may be disposed within the chamber 2. The EUV collector mirror 23 may have a first focal point and a second focal point. A multilayer reflective film, in which, for example, molybdenum or tungsten and silicon are used for alternating layers, may be formed on the surface of the EUV collector mirror 23. It is preferable for the EUV collector mirror 23 to be disposed so that, for example, the first focal point is located at a plasma generation region 25, where plasma is generated or in the vicinity thereof, and the second focal point is located at an intermediate focal point (IF), or intermediate focal point 292, a desired focal position defined by the specifications of the exposure apparatus. A through-hole 24 for transmitting the pulsed laser beam 33 may be provided in a central area of the EUV collector mirror 23.

The EUV light generation apparatus 1 may include an EUV light generation controller 5. The EUV light generation apparatus 1 may also include a target sensor 4. The target sensor 4 may detect the presence, trajectory, position, and other properties of a target. The target sensor 4 may have image capturing functionality.

Furthermore, the EUV light generation apparatus 1 may include a connecting section 29 for enabling the interior of the chamber 2 to communicate with the interior of an exposure apparatus 6. A wall 291 in which an aperture is formed may be provided within the connecting section 29. The wall 291 may be disposed so that the aperture therein is located at the position of the second focal point of the EUV collector mirror 23.

Furthermore, the EUV light generation apparatus 1 may include a laser beam direction control unit 34, a laser beam focusing optical system 22, a target collection section 28 for collecting droplets 27, and other components. The laser beam direction control unit 34 may include an optical element for defining the direction in which laser beams and an actuator for adjusting the position, attitude, and other properties of the optical element.

2.2 Operation

Referring to FIG. 1, a pulsed laser beam 31 outputted from the laser apparatus 3 may traverse the laser beam direction control unit 34, pass through the window 21 as the pulsed laser beam 32, and enter the chamber 2. The pulsed laser beam 32 may progress into the chamber 2 along at least one laser beam path, be reflected by the laser beam focusing optical system 22, and irradiate at least one droplet 27 as the pulsed laser beam 33.

The droplet 27 may be outputted from the target supply apparatus 7 toward the plasma generation region 25 within the chamber 2. The droplet 27 may be irradiated by at least one pulse of the pulsed laser beam 33. The droplet 27 irradiated by the pulsed laser beam 33 may be turned into plasma, and light 251 including EUV light. Hereinafter, "light including EUV light" will sometimes be referred to as "EUV light". EUV light 251 may be radiated from that plasma. The EUV light 251 may be focused and reflected by the EUV collector mirror 23. EUV light 252 reflected by the EUV collector mirror 23 may be outputted to the exposure apparatus 6 through the intermediate focal point 292. Note that a single droplet 27 may be irradiated with a plurality of pulses of the pulsed laser beam 33.

The EUV light generation controller 5 may coordinate control of the EUV light generation system 11 as a whole. The EUV light generation controller 5 may process image data or the like of the droplet 27 as captured by the target sensor 4. The EUV light generation controller 5 may control, for example, the timing at which the droplet 27 is outputted, the velocity at which the droplet 27 is outputted, and the like. Furthermore, the EUV light generation controller 5 may also control, for example, the laser oscillation timing of the laser apparatus 3, the direction of travel of the pulsed laser beam 32, the focal position of the pulsed laser beam 33, and the like. The aforementioned types of control are merely examples, and other types of control may be added as necessary.

3. EUV Light Generation Apparatus Including Target Supply Apparatus

3.1. Terms

Hereinafter, setting a temperature toward the leading end of a nozzle to be higher than a temperature at the other end of the nozzle may be referred to as "applying a temperature gradient in the axial direction". Meanwhile, setting a temperature to decrease from the inner walls of a target generator toward the center of the target generator may be referred to as "applying a temperature gradient in the radial direction".

3.2 First Embodiment

3.2.1 Overview

According to a first embodiment of the present disclosure, a target supply apparatus may control a plurality of heaters provided in a nozzle so that the temperature of a target material within a target generator increases toward the leading end of the nozzle.

According to such a configuration, the separation of oxidants from the target material near the nozzle of the target generator may be suppressed. Accordingly, the likelihood that the nozzle hole will be clogged by oxidants may be reduced. Further still, the likelihood that oxidants will separate in the nozzle hole may be reduced, and as a result, changes in the output direction of the target material may be suppressed.

3.2.2 Configuration

Figure 2:
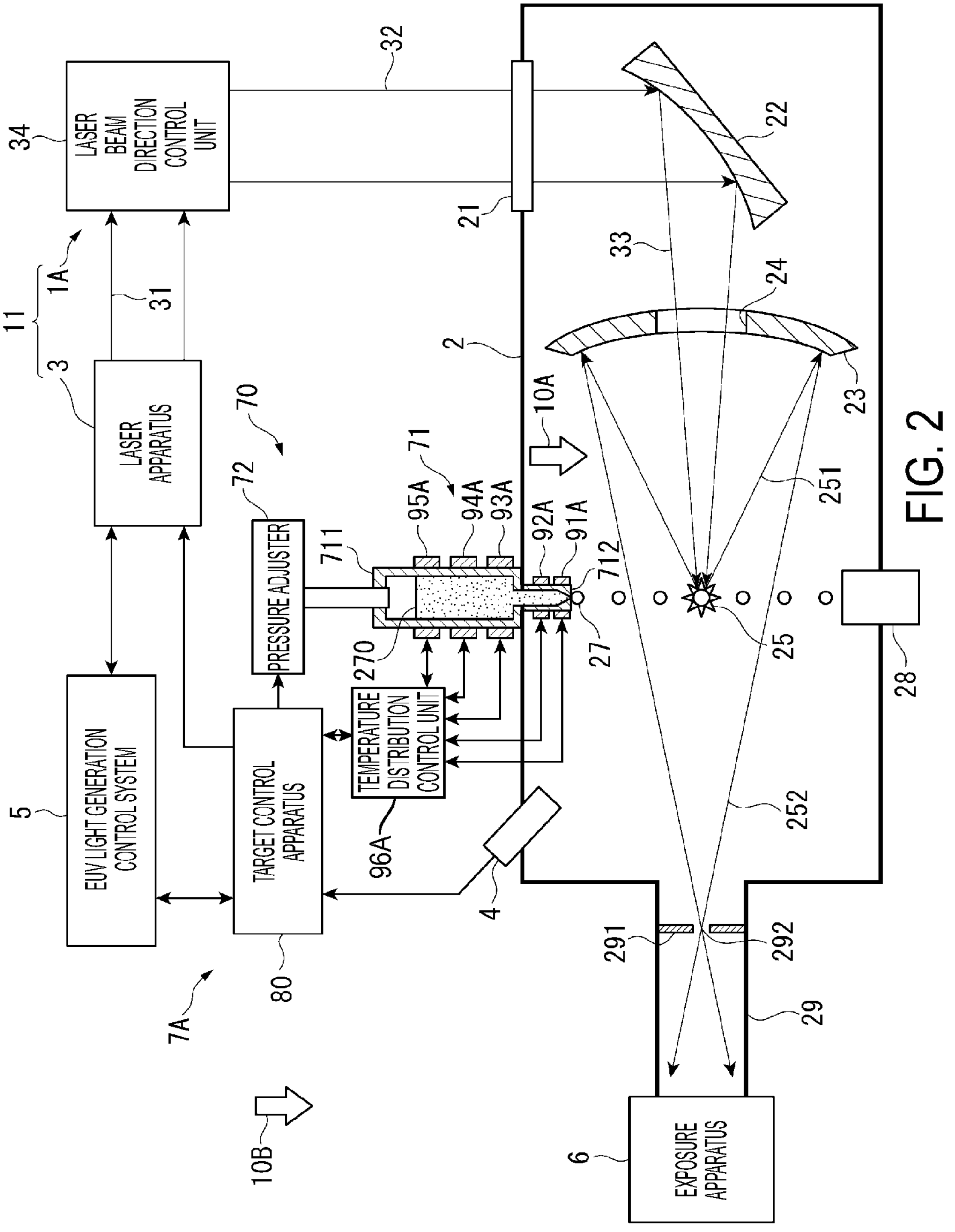
FIG. 2 illustrates the overall configuration of an EUV light generation apparatus in which a target supply apparatus according to a first embodiment is applied.

FIG. 2 illustrates the overall configuration of an EUV light generation apparatus in which a target supply apparatus according to the first embodiment is applied.

An EUV light generation apparatus 1A, as shown in FIG. 2, may include the chamber 2 and a target supply apparatus 7A. The target supply apparatus 7A may include a target generation unit 70 and a target control apparatus 80.

The target generation unit 70 may include a target generator 71 and a pressure adjuster 72. The target generator 71 may, in its interior, include a tank 711 for holding a target material 270. The tank 711 may be cylindrical in shape. A nozzle 712 for outputting the target material 270 in the tank 711 to the chamber 2 as the droplets 27 may be provided in the tank 711. A nozzle hole, serving as a through-hole that enables the interior of the tank 711 to communicate with the interior of the chamber 2, may be provided in a leading end area of the nozzle 712. The target generator 71 may be provided so that the tank 711 is positioned outside of the chamber 2 and the nozzle 712 is positioned inside of the chamber 2. The pressure adjuster 72 may be connected to the tank 711. In addition, the pressure adjuster 72 may be electrically connected to the target control apparatus 80.

3.2.3 Solubility of Oxygen Atoms in Tin

Figure 3:
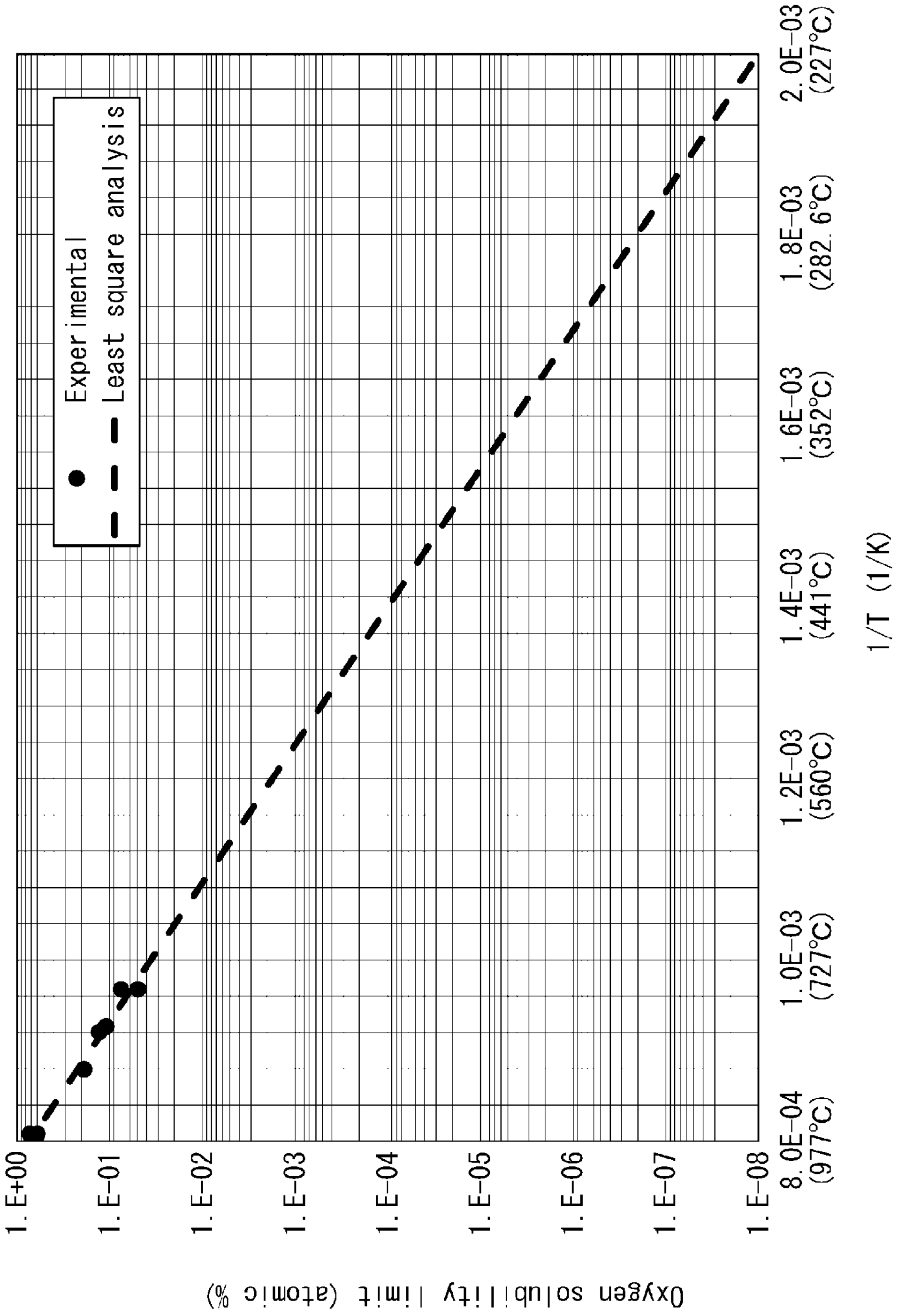
FIG. 3 is a graph illustrating the solubility of oxygen atoms in tin.

FIG. 3 is a graph illustrating the solubility of oxygen atoms in tin.

Oxygen atoms may be dissolved within the target material 270 held in the target generator 71. In the case where the target material 270 is tin, the solubility of the oxygen atoms in tin may be lower as the temperature of the tin drops, as shown in FIG. 3. When tin is refined, the temperature for this refinement may be referred to as a first melting temperature. In the present application, the refined tin is melted in the target generator at a temperature that may be referred to as the second melting temperature. The second melting temperature is lower than the first melting temperature. Accordingly, in the case where tin that has previously hardened after being heated to the first melting temperature is once again melted at the second melting temperature, an amount of oxygen atoms that cannot be dissolved into the tin may be obtained by subtracting a second dissolving amount from a first dissolving amount. In the above example, the second dissolving amount is the amount of oxygen atoms that can be dissolved into the tin at the second melting temperature, and the first dissolving amount is the amount of oxygen atoms that can be dissolved into the tin at the first melting temperature. As a result, the oxygen atoms that cannot be dissolved may couple to the tin and separate as oxidized tin.

Depending on how the chamber 2 is arranged, it is not necessarily the case that a pre-set output direction for the target material 270 will match a gravitational direction 10B. The pre-set output direction of the target material 270 may be the same as the axial direction of the nozzle 712, and will hereinafter sometimes be referred to as a set output direction 10A. The configuration may be such that the target material 270 is outputted at an angle or horizontally relative to the gravitational direction 10B. Note that the first embodiment and the following second through fifth embodiments describe cases in which the chamber 2 is arranged so that the set output direction 10A and the gravitational direction 10B match.

Meanwhile, the target supply apparatus 7A may include a first heater 91A, a second heater 92A, a third heater 93A, a fourth heater 94A, a fifth heater 95A, and a temperature distribution control unit 96A serving as a control unit.

The first heater 91A may be provided on the outer circumferential surface on the leading end side of the nozzle 712. The second heater 92A may be provided on the outer circumferential surface of the nozzle 712 above the first heater 91A, for example, on the opposite side thereof in the gravitational direction 10B. The third heater 93A may be provided on the outer circumferential surface on the lower end side in the direction toward the nozzle 712 of the tank 711. The fourth heater 94A may be provided on the tank 711 at a position that is higher, i.e., further from the nozzle 712, than the third heater 93A. The fifth heater 95A may be provided on the tank 711 at a position that is higher than the fourth heater 94A. In this manner, the first through fifth heaters 91A to 95A may be provided so as to be arranged from downstream to upstream in the direction in which the target material 270 advances, relative to the set output direction 10A of the target material 270. The intervals between the first through fifth heaters 91A to 95A may each be the same or may be different. Furthermore, the first through fifth heaters 91A to 95A may each be electrically connected to the temperature distribution control unit 96A. Heaters that use heat generating elements that emit heat through electrical resistance, such as ceramic heaters, may be used for the first through fifth heaters 91A to 95A. However, the heaters are not limited thereto, and may employ infrared heaters or the like. Furthermore, control of the amount of heat emitted may be current control, voltage control, or frequency control. The first through fifth heaters 91A to 95A will be described hereinafter as current-controlled ceramic heaters, but the heaters are not limited thereto.

The temperature distribution control unit 96A may be electrically connected to the target control apparatus 80. The temperature distribution control unit 96A may apply a temperature gradient in the axial direction to the target material 270. The temperature distribution control unit 96A may carry out control for, for example, supplying currents set individually for the first through fifth heaters 91A to 95A to those respective heaters based on signals sent by the target control apparatus 80. As a result, the temperature of the target material 270 may be higher toward the leading end of the nozzle 712.

3.2.4 Operation

The control for applying the temperature gradient in the axial direction to the target material 270 may be carried out in the following periods.

Period 1: when the target material 270 is melted within the target generator 71 for starting the continuous generation of pulsed EUV light 251.

Period 2: while the pulsed EUV light 251 is being continuously generated.

Period 3: when the target material 270 is hardened within the target generator 71 for stopping the continuous generation of the pulsed EUV light 251.

The EUV light generation controller 5 may monitor and manage the stated periods 1, 2, and 3, and may send a temperature distribution control signal to the target control apparatus 80. The target control apparatus 80 may then send the temperature distribution control signal received from the EUV light generation controller 5 to the temperature distribution control unit 96A of the target supply apparatus 7A. The temperature distribution control unit 96A may, upon receiving the temperature distribution control signal, control the first through fifth heaters 91A to 95A so as to apply a temperature gradient in the axial direction to the target material 270.

The temperature distribution control unit 96A may control the first through fifth heaters 91A to 95A so that the relationship in the following Formula (1) holds true. Note that T1*t* through T5*t* may be variables in period 1 and period 3, and may be constants in period 2.

$$T1t>T2t>T3t>T4t>T5t \tag{1}$$

T1*t*: target temperature of first heater 91A

T2*t*: target temperature of second heater 92A

T3*t*: target temperature of third heater 93A

T4*t*: target temperature of fourth heater 94A

T5*t*: target temperature of fifth heater 95A

For example, in the case where all of the first through fifth heaters 91A to 95A are heaters that have the same capabilities, the temperature distribution control unit 96A may set the current supplied to the first through fifth heaters 91A to 95A so that the relationship in the following Formula (2) holds true, in order that the relationship in Formula (1) holds true. The temperature distribution control unit 96A may supply a current to the first through fifth heaters 91A to 95A in period 1, period 2, and period 3 so that the relationship in the following Formula (2) holds true. Note that I1*t* through I5*t* may be variables in period 1 and period 3, and may be constants in period 2.

$$I1t>I2t>I3t>I4t>I5t \tag{2}$$

I1*t*: current supplied to first heater 91A

I2*t*: current supplied to second heater 92A

I3*t*: current supplied to third heater 93A

I4*t*: current supplied to fourth heater 94A

I5*t*: current supplied to fifth heater 95A

On the other hand, in the case where one of the first through fifth heaters 91A to 95A has different capabilities from the other heaters, the temperature distribution control unit 96A may supply currents, set so that Formula (1) holds true, to the respective heaters on an individual basis. At this time, the currents that ensure Formula (1) holds true may be set based on the results of prior experimentation or the like.

When in period 1 the temperature distribution control unit 96A carries out control for raising the temperature so that the relationship in the stated Formula (1) holds true, the target material 270 may be heated while the state in which the temperature is higher toward the leading end of the nozzle 712 is maintained. When the target material 270 is heated to greater than or equal to the melting point of that target material 270, the target material 270 may melt. As the heating process progresses, the target material 270 may melt first toward the lower end of the target generator 71, that is, toward the leading end of the nozzle 712, and may melt last toward the upper end of the target generator 71.

In addition, when in period 2 the temperature distribution control unit 96A carries out control for maintaining the temperature so that the relationship in the stated Formula (1) holds true, the temperature of the target material 270 may be maintained in a state where the temperature is higher toward the leading end of the nozzle 712. The target material 270 may be outputted as the droplet 27 and the EUV light 251 may be generated while this state is maintained.

Here, in the case where the target material 270 is tin, in period 1 and period 2, the target temperatures T1*t* to T5*t* (T1*t*, T2*t*, T3*t*, T4*t*, and T5*t*) may be greater than or equal to 231.9° C., which is the melting point of tin. Meanwhile, in the case where the portion of the target generator 71 that makes contact with the tin is formed of molybdenum or tungsten, the target temperatures T1*t* to T5*t* may be less than 370° C. If the temperature is greater than or equal to 370° C., an alloy of tin and molybdenum or tungsten may be produced.

Meanwhile, in the case where the target generator 71 is formed of graphite, or pyrolytic boron nitride (PBN) produced through chemical vapor deposition (CVD), the target temperatures T1*t* to T5*t* may be no greater than 1,000° C. Graphite, PBN, or the like may be comparatively chemically stable even at 1,000° C. Furthermore, because 1000° C. is lower than the evaporating temperature of tin, tin may be suppressed from evaporating even if the tin is heated to 1000° C.

Furthermore, when in period 3 the temperature distribution control unit 96A carries out control for lowering the temperature of the respective heaters so that the relationship in the stated Formula (1) holds true, the target material 270 may be cooled while the temperature is kept higher toward the leading end of the nozzle 712. When the target material 270 is cooled to less than the melting point of that target material 270, the target material 270 may harden. At this time, the target material 270 may harden first toward the upper end of the target generator 71, and may harden last toward the lower end of the target generator 71.

As described above, the temperature distribution control unit 96A of the target supply apparatus 7A may, in the stated periods 1, 2, and 3, control the first through fifth heaters 91A to 95A so as to apply a temperature gradient in the axial direction to the target material 270.

Through this, the separation and accumulation of oxidants from the target material 270 in the vicinity of the through-hole within the nozzle 712 of the target generator 71 may be suppressed. Accordingly, the likelihood that the through-hole will be clogged by oxidants may be reduced. Furthermore, changes in the output direction of the droplet 27 may be suppressed.

Note that the number of heaters may be two to four or more than five, as long as a temperature gradient in the axial direction can be applied to the target material 270.

3.3 Second Embodiment

3.3.1 Overview

According to a second embodiment of the present disclosure, the target supply apparatus may include a plurality of heater temperature sensors. The plurality of heater temperature sensors may detect the temperature of the areas heated by the plurality of heaters or the temperature in the vicinities thereof. At least one heater temperature sensor may be provided for each heater. In other words, the number of heater temperature sensors may be the same as the number of heaters, or may be greater than the number of heaters. The control unit may control the plurality of heaters based on the temperatures detected by the heater temperature sensors.

According to such a configuration, the temperatures of the heaters may be controlled so as to apply a temperature gradient in the axial direction, and the temperature of the target material may be adjusted, in accordance with the state of the heating of the target material. Furthermore, it is possible to detect that all of the target material has melted, and thus the generation of EUV light may be commenced at an appropriate time. Further still, it is possible to detect that all of the target material has hardened, and thus the heaters may be stopped at an appropriate time.

3.3.2 Configuration

Figure 4:
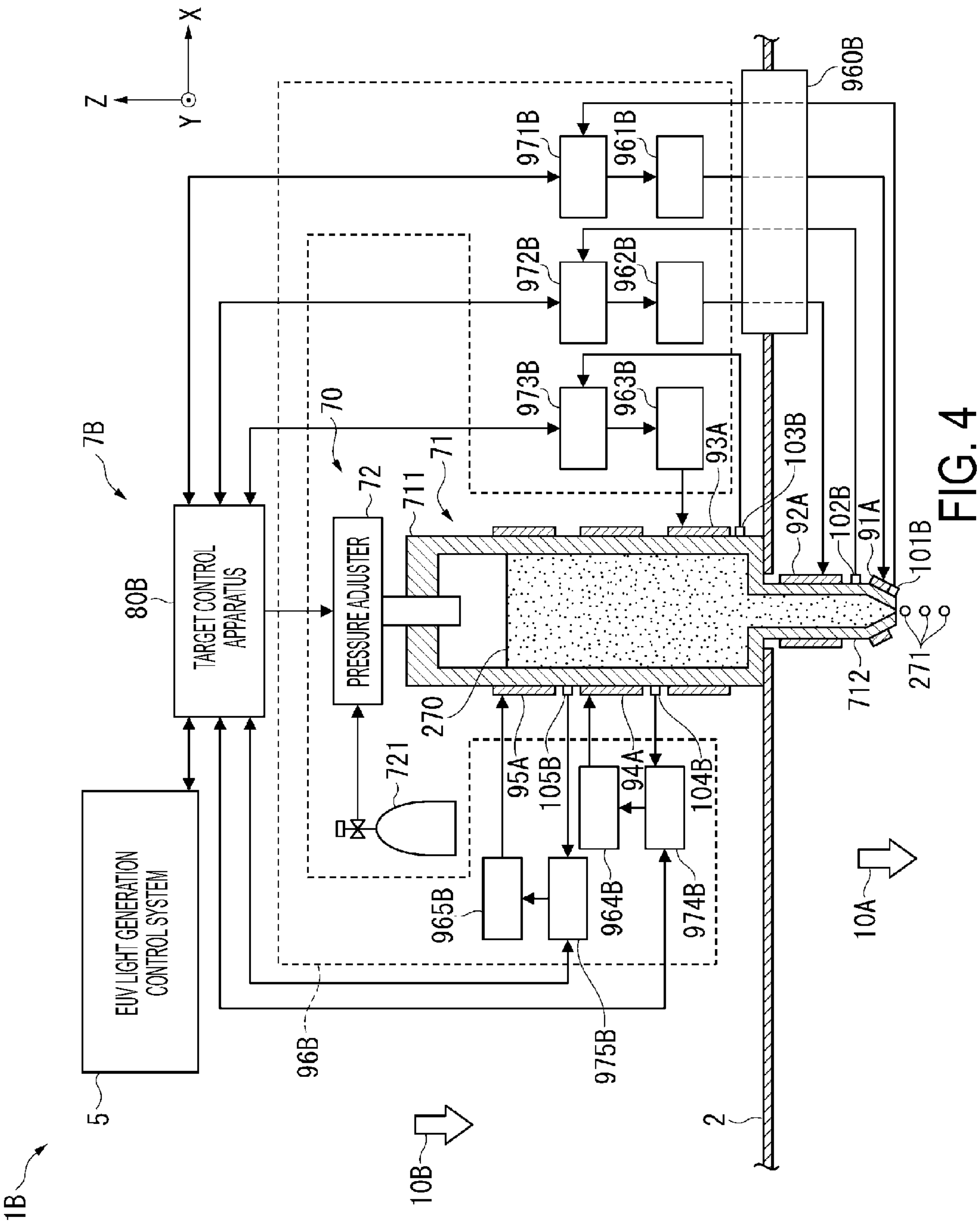
FIG. 4 illustrates the overall configuration of an EUV light generation apparatus in which a target supply apparatus according to a second embodiment is applied.

FIG. 4 illustrates the overall configuration of an EUV light generation apparatus in which a target supply apparatus according to the second embodiment is applied. Note that the configurations of other parts of the EUV light generation apparatus may be the same as those illustrated in FIG. 2.

The differences between a target supply apparatus 7B that partially configures an EUV light generation apparatus 1B according to the second embodiment and the target supply apparatus 7A of the EUV light generation apparatus 1A in the first embodiment may, as shown in FIG. 4, be different configurations for a target control apparatus 80B and a temperature distribution control unit 96B, and that a first heater temperature sensor 101B, a second heater temperature sensor 102B, a third heater temperature sensor 103B, a fourth heater temperature sensor 104B, and a fifth heater temperature sensor 105B, collectively first through fifth heater temperature sensors 101B to 105B, have been newly added.

The target supply apparatus 7B may include the target generator 71, the pressure adjuster 72, the first through fifth heaters 91A to 95A, the temperature distribution control unit 96B serving as a control unit, and the first through fifth heater temperature sensors 101B to 105B.

An inert gas tank 721 may be connected to the pressure adjuster 72. The target control apparatus 80B may be electrically connected to the pressure adjuster 72. The pressure adjuster 72 may be configured so as to adjust the pressure within the tank 711 by controlling the pressure of an inert gas supplied from the inert gas tank 721.

The first heater temperature sensor 101B may be provided lower on the nozzle 712, i.e., closer to the leading end of the nozzle 712, than the first heater 91A. The first heater temperature sensor 101B may be electrically connected to a first temperature controller 971B in the temperature distribution control unit 96B, via a feedthrough 960B provided in the chamber 2. The first heater temperature sensor 101B may detect a temperature at an area heated by the first heater 91A and send a signal corresponding to the detected temperature to the first temperature controller 971B.

The second heater temperature sensor 102B may be provided lower on the nozzle 712 than the second heater 92A, and may be electrically connected to a second temperature controller 972B, mentioned later, in the temperature distribution control unit 96B, via the feedthrough 960B. The second heater temperature sensor 102B may detect a temperature at an area heated by the second heater 92A and send a signal corresponding to the detected temperature to the second temperature controller 972B.

The third heater temperature sensor 103B may be provided lower on the tank 711 than the third heater 93A, and may be electrically connected to a third temperature controller 973B, mentioned later, in the temperature distribution control unit 96B. The third heater temperature sensor 103B may detect a temperature at an area heated by the third heater 93A and send a signal corresponding to the detected temperature to the third temperature controller 973B.

The fourth heater temperature sensor 104B and the fifth heater temperature sensor 105B may be provided on the tank 711 below the fourth heater 94A and the fifth heater 95A, respectively. The fourth heater temperature sensor 104B and the fifth heater temperature sensor 105B may be electrically connected to a fourth temperature controller 974B and a fifth temperature controller 975B, respectively, in the temperature distribution control unit 96B. The fourth heater temperature sensor 104B and the fifth heater temperature sensor 105B may detect temperatures at areas heated by the fourth heater 94A and the fifth heater 95A, respectively, and may send signals corresponding to the detected temperatures to the fourth temperature controller 974B and the fifth temperature controller 975B, respectively.

The temperature distribution control unit 96B may include a first heater power source 961B, a second heater power source 962B, a third heater power source 963B, a fourth heater power source 964B, and a fifth heater power source 965B, collectively, first through fifth heater power sources 961B to 965B, and the first temperature controller 971B, the second temperature controller 972B, the third temperature controller 973B, the fourth temperature controller 974B, and the fifth temperature controller 975B, collectively, the first through fifth temperature controllers 971B to 975B.

The first and second heater power sources 961B and 962B may be electrically connected to the first and second heaters 91A and 92A, respectively, via the feedthrough 960B. Furthermore, the first and second heater power sources 961B and 962B may be electrically connected to the first and second temperature controllers 971B and 972B, respectively. The first heater power source 961B may cause the first heater 91A to emit heat by supplying power to the first heater 91A based on a signal from the first temperature controller 971B. As a result, the target material 270 within the nozzle 712 may be heated. The second heater power source 962B may cause the second heater 92A to emit heat based on a signal from the second temperature controller 972B.

The third through fifth heater power sources 963B to 965B may be electrically connected to the third through fifth heaters 93A to 95A and the third through fifth temperature controllers 973B to 975B, respectively. The third through fifth heater power sources 963B to 965B may respectively cause the third through fifth heaters 93A to 95A to emit heat based on signals from the third through fifth temperature controllers 973B to 975B, respectively.

The first through fifth temperature controllers 971B to 975B may be electrically connected to the target control apparatus 80B. The first through fifth temperature controllers 971B to 975B may determine a temperature of the target generator 71 based on signals from the first through fifth heater temperature sensors 101B to 105B, respectively, and may send, to the respective first through fifth heaters 91A to 95A, signals for applying a temperature gradient in the axial direction to the target material 270 in the target generator 71.

3.3.3 Operation

Figure 5:
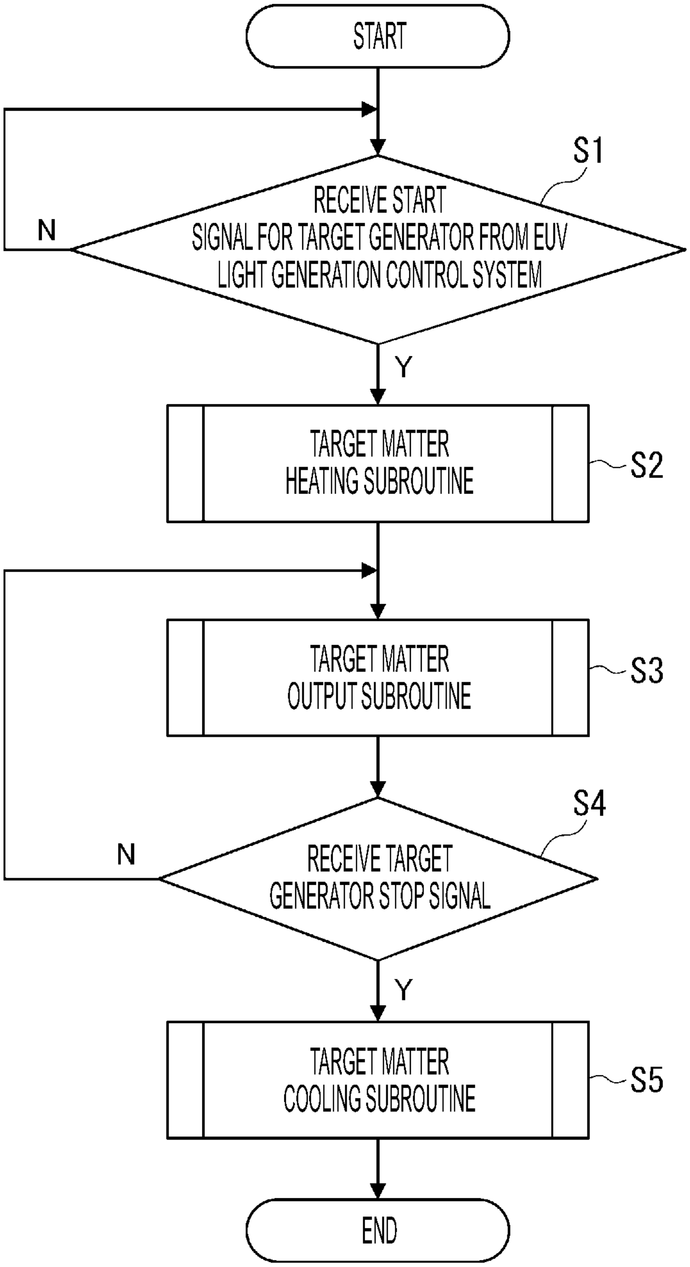
FIG. 5 is a flowchart illustrating an EUV light generation process.
Figure 6:
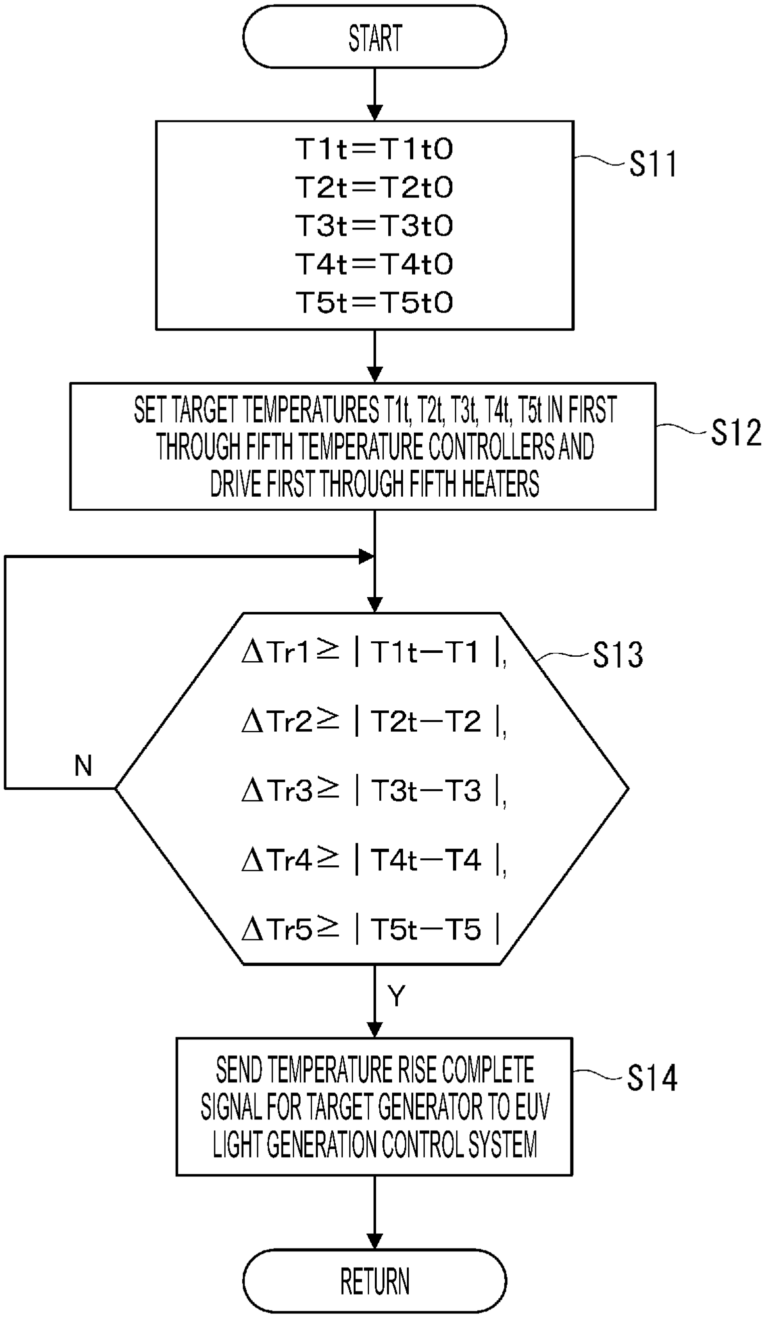
FIG. 6 is a flowchart illustrating a target material heating subroutine.
Figure 7:
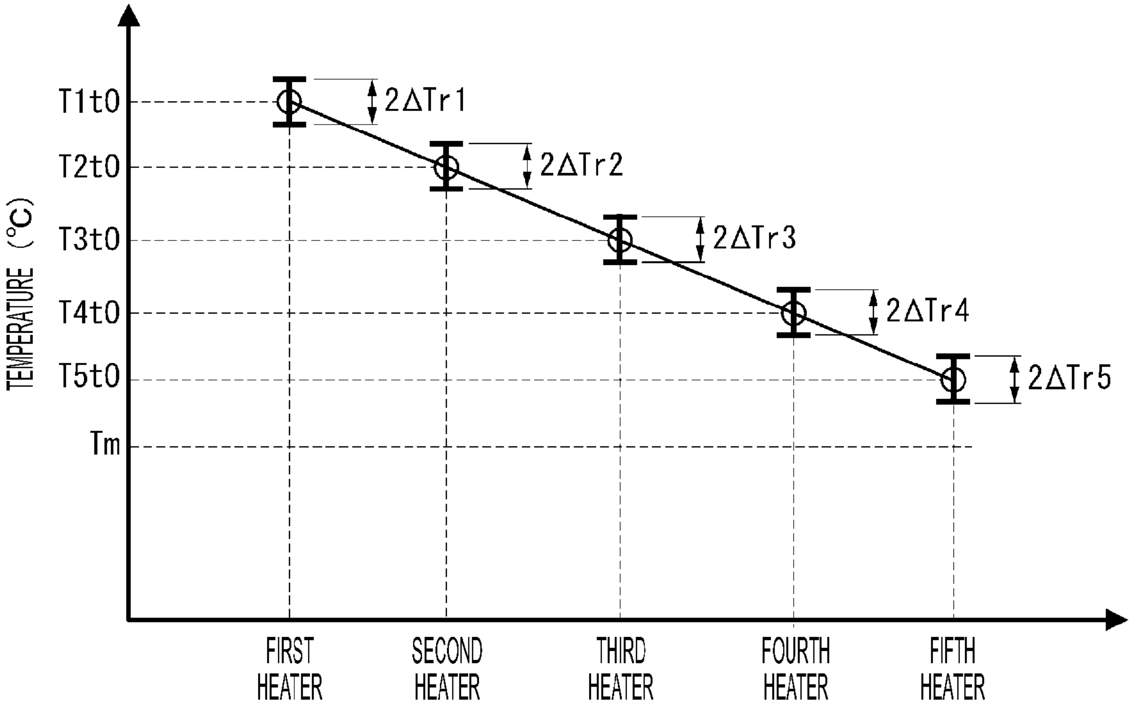
FIG. 7 illustrates target temperatures for first through fifth heaters in graphical form.
Figure 8:
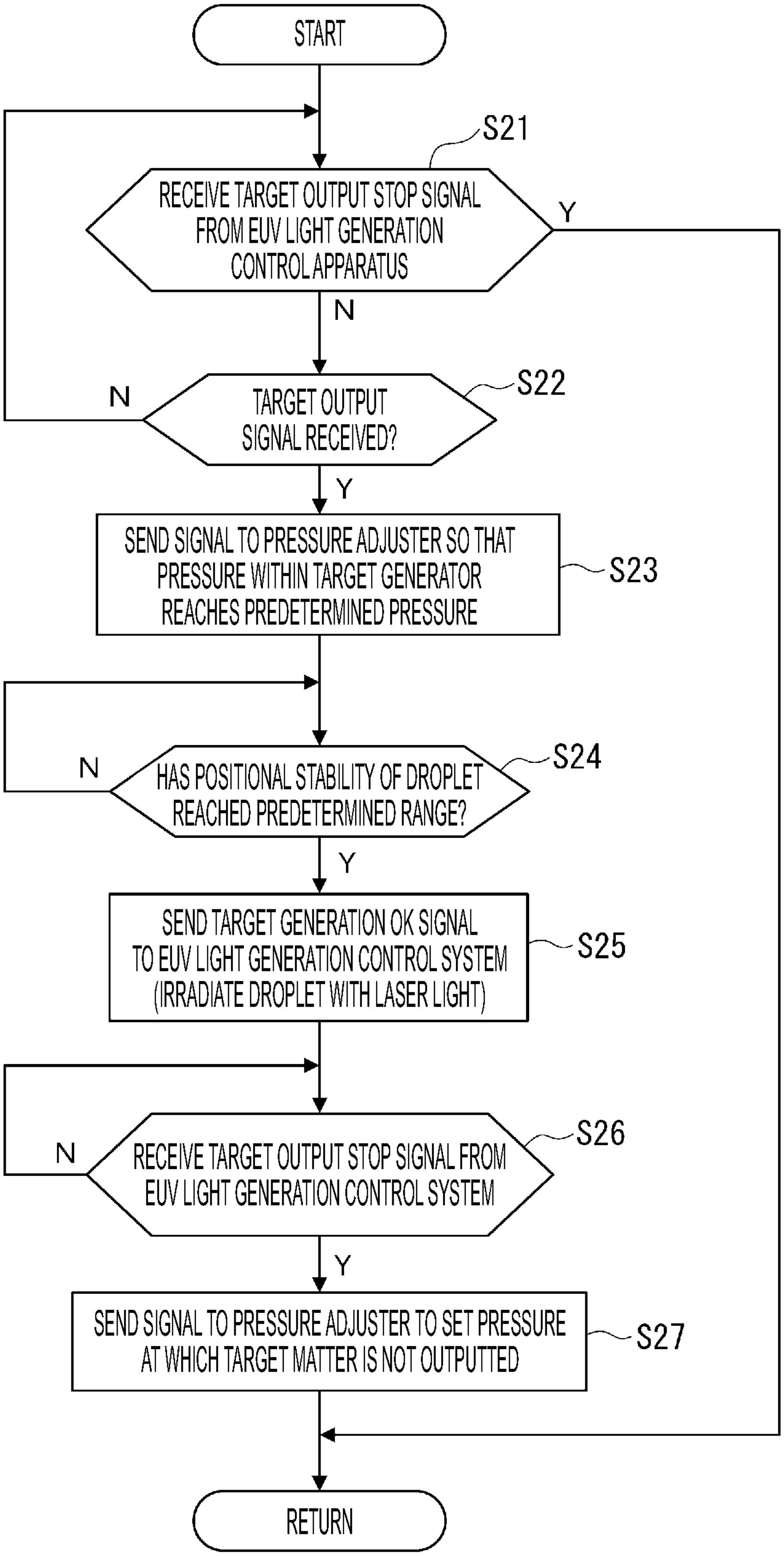
FIG. 8 is a flowchart illustrating a target material output subroutine.
Figure 9:
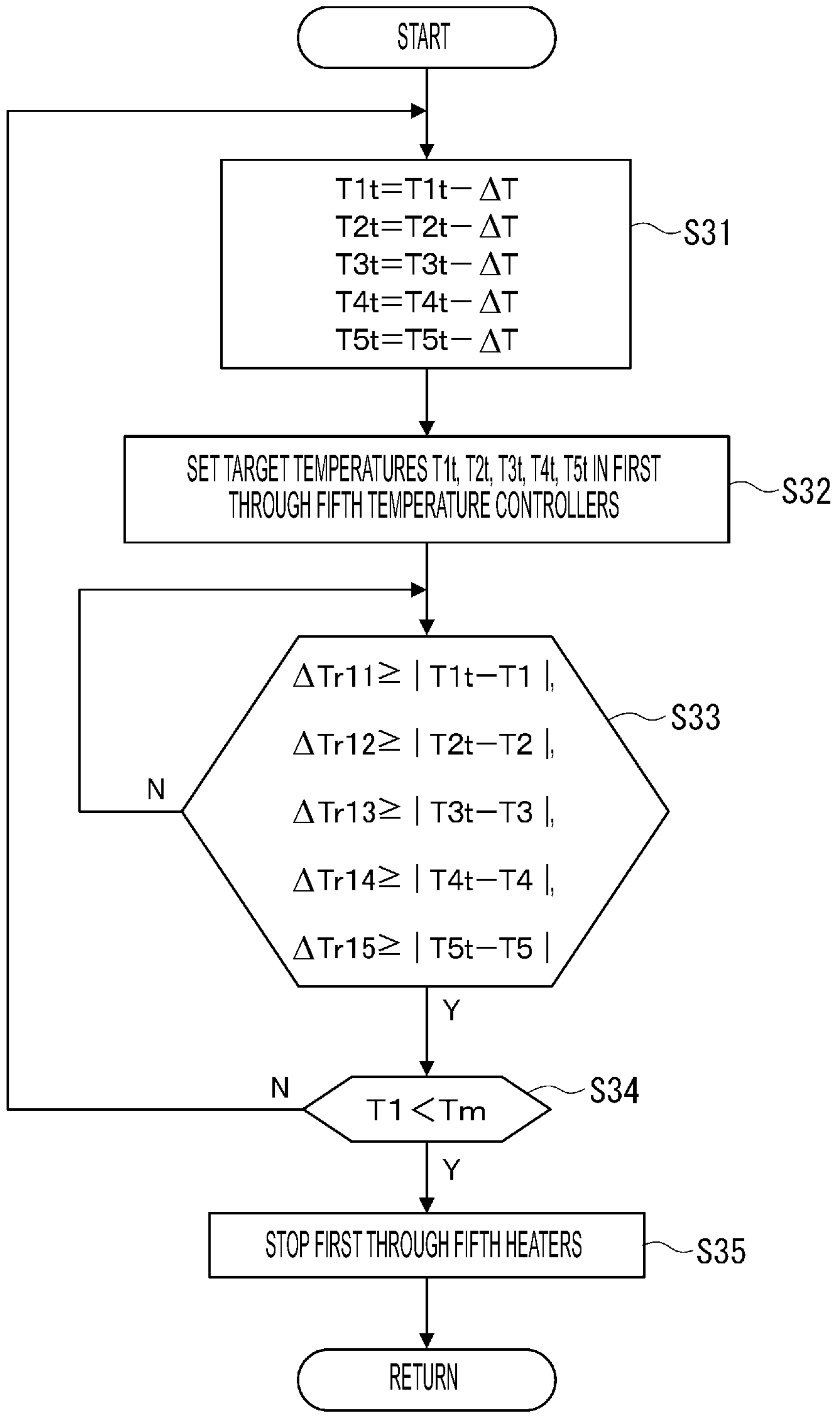
FIG. 9 is a flowchart illustrating a target material cooling subroutine.

FIG. 5 is a flowchart illustrating an EUV light generation process. FIG. 6 is a flowchart illustrating a target material heating subroutine. FIG. 7 illustrates target temperatures for the first through fifth heaters in graphical form. FIG. 8 is a flowchart illustrating a target material output subroutine. FIG. 9 is a flowchart illustrating a target material cooling subroutine.

As shown in FIG. 5, the target control apparatus 80B may determine whether or not a start signal for the target generator 71 has been received from the EUV light generation controller 5 (step S1). This start signal may be a signal for starting the melting of the target material 270 within the target generator 71.

In the case where the target control apparatus 80B has determined that the start signal has not been received in step S1, the processing of step S1 may be carried out once again after a predetermined amount of time has passed. On the other hand, in the case where the target control apparatus 80B has determined that the start signal has been received in step S1, processing based on the target material heating subroutine may be carried out (step S2). As a result of the processing of step S2, the hardened target material 270 within the target generator 71 may melt, and it may become possible to output the target material 270 from the nozzle 712 as a result. Alternatively, the temperature of the target material 270 within the target generator 71 that has not reached a sufficiently high temperature may rise to the necessary temperature, and it may become possible to output the target material 270 from the nozzle 712 as a result.

Specifically, the target control apparatus 80B may, as shown in FIG. 6, set the target temperatures T1*t* to T5*t* of the first through fifth heaters 91A to 95A to respective temperatures T1*t*0 to T5*t*0 (T1*t*0, T2*t*0, T3*t*0, T4*t*0, and T5*t*0) (step S11). The temperatures T1*t*0 to T5*t*0 may, as indicated in FIG. 7, have the temperature T1*t*0 as the highest temperature and the temperature T5*t*0 as the lowest temperature. In addition, the temperatures T1*t*0 to T5*t*0 may be greater than or equal to a melting point Tm of the target material 270. A temperature difference between the respective temperatures T1*t*0 to T5*t*0 may, for example, be approximately 10° C. For example, the temperatures T1*t*0, T2*t*0, T3*t*0, T4*t*0, and T5*t*0 may be 370° C., 360° C., 350° C., 340° C., and 330° C., respectively.

Next, the target control apparatus 80B may, as shown in FIG. 6, set the target temperatures T1*t* to T5*t* in the first through fifth temperature controllers 971B to 975B and drive the first through fifth heaters 91A to 95A (step S12).

Due to the processing of step S12, the first through fifth heaters 91A to 95A may heat the target material 270 within the target generator 71 so as to apply a temperature gradient in the axial direction. The first through fifth heater temperature sensors 101B to 105B may then detect temperatures at the areas of the target material 270 heated by the first through fifth heaters 91A to 95A, and may send signals corresponding to those temperatures to the first through fifth temperature controllers 971B to 975B, respectively. The first through fifth temperature controllers 971B to 975B may send the signals received from the first through fifth heater temperature sensors 101B to 105B to the target control apparatus 80B.

After this, the target control apparatus 80B may determine whether or not all of the conditions in the following Formulas (3) to (7) are met, based on the signals received from the first through fifth temperature controllers 971B to 975B (step S13).

$$\Delta Tr1 \leq |T1t - T1| \quad (3)$$

$$\Delta Tr2 \leq |T2t - T2| \quad (4)$$

$$\Delta Tr3 \leq |T3t - T3| \quad (5)$$

$$\Delta Tr4 \leq |T4t - T4| \quad (6)$$

$$\Delta Tr5 \leq |T5t - T5| \quad (7)$$

T1: temperature detected by the first heater temperature sensor 101B

T2: temperature detected by the second heater temperature sensor 102B

T3: temperature detected by the third heater temperature sensor 103B

T4: temperature detected by the fourth heater temperature sensor 104B

T5: temperature detected by the fifth heater temperature sensor 105B

ΔTr1, ΔTr2, ΔTr3, ΔTr4, ΔTr5: permissible ranges of temperatures as a result of control Here, the permissible ranges ΔTr1 to ΔTr5 may, for example, be any temperature within a range from greater than or equal to 1° C. and less than or equal to 3° C. Meanwhile, the permissible ranges ΔTr1 to ΔTr5 may be the same as each other, or may be different.

In the case where the target control apparatus 80B has determined in step S13 that at least one of the conditions of Formulas (3) to (7) has not been met, the processing of step S13 may be carried out once again after a predetermined amount of time has passed. On the other hand, in the case where the target control apparatus 80B has determined in step S13 that all of the conditions of Formulas (3) to (7) have been met, a target generator 71 temperature rise complete signal may be sent to the EUV light generation controller 5 (step S14), and the processing based on the target material heating subroutine may end. In other words, the target control apparatus 80B may send the temperature rise complete signal in the case where temperatures T1 to T5 detected by the first through fifth heater temperature sensors 101B to 105B have been determined to be within the permissible range of the target temperatures T1*t* to T5*t*, respectively.

Through the stated processing, the target material 270 may gradually melt from the leading end side of the nozzle 712 and approach the target temperature.

The target control apparatus 80B may, after sending the temperature rise complete signal, carry out processing based on the target material output subroutine as shown in FIG. 5 (step S3). Through the processing in step S3, the target control apparatus 80B may output the target material 270 melted in step S2. Through this, the EUV light may be generated. The target control apparatus 80B may continue to perform control for applying a temperature gradient in the axial direction to the target material 270 in the target generator 71 while the processing in step S3 is being carried out.

Specifically, the target control apparatus 80B may, as shown in FIG. 8, determine whether or not a target output stop signal has been received from the EUV light generation controller 5 (step S21). In the case where the target control apparatus 80B has determined in step S21 that the target output stop signal has been received, the processing of the target material output subroutine may end, and the procedure may move to the processing of step S4 indicated in FIG. 5. On the other hand, in the case where the target control apparatus 80B has determined in step S21 that the target output stop signal has not been received, it may be determined whether or not a target output signal has been received from the EUV light generation controller 5 (step S22).

In the case where the target control apparatus 80B has determined that the target output signal has not been received in step S22, the processing of step S21 may be carried out once again. On the other hand, in the case where the target control apparatus 80B has determined that the target output signal has been received in step S22, a signal may be sent to the pressure adjuster 72 so that the pressure within the target generator 71 reaches a predetermined pressure (step S23).

Upon receiving this signal, the pressure adjuster 72 may adjust the pressure within the tank 711 to a pressure at which the target material 270 may be outputted. Meanwhile, the target control apparatus 80B may cause a piezoelectric element (not shown) disposed near the leading end of the nozzle 712 to vibrate. As a result, the target material 270 may be outputted as a droplet 271.

Information indicating the position, velocity, size, travel direction, timing of passing a predetermined position, passage cycle, the stability of those items, and other properties of the outputted droplet 271 may be detected by the target sensor 4 (see FIG. 2). These detected pieces of information may be received by the target control apparatus 80B as respective signals.

The target control apparatus 80B may then determine whether or not the positional stability of the droplet 271 has reached a predetermined range, or in other words, whether or not the position in which the droplet 271 is outputted is within a predetermined range (step S24). In the case where the target control apparatus 80B has determined in step S24 that the positional stability is not within the predetermined range, the processing of step S23 may be carried out on the droplet 271 outputted next or the droplet 271 outputted after a predetermined number of droplets 271 have been outputted. On the other hand, in the case where the target control apparatus 80B has determined in step S24 that the positional stability is within the predetermined range, a target generation OK signal may be sent to the EUV light generation controller 5 (step S25).

The EUV light generation controller 5 may be configured so that, upon receiving the target generation OK signal, the EUV light generation controller 5 outputs a pulsed laser beam oscillation trigger to the laser apparatus 3 (see FIG. 2) so that the droplet 271 is irradiated with the pulsed laser beam when the droplet 271 reaches the plasma generation region 25 (see FIG. 2).

The pulsed laser beam outputted from the laser apparatus 3 may irradiate one or more droplets 271. When the droplet 271 is irradiated with the pulsed laser beam, the droplet 271 may be turned into plasma and may radiate electromagnetic waves including EUV light.

Then, in the case where the generation of EUV light is to be ended, the EUV light generation controller 5 may stop the output of the pulsed laser beam from the laser apparatus 3 and may send the target output stop signal to the target control apparatus 80B.

The target control apparatus 80B may determine whether or not the target output stop signal has been received from the EUV light generation controller 5 (step S26). In the case where the target control apparatus 80B has determined that the signal has not been received in step S26, the processing of step S26 may be carried out once again. On the other hand, in the case where the target control apparatus 80B has determined in step S26 that the signal has not been received, a signal for setting the pressure within the target generator 71 to a pressure at which the droplet 271 is not outputted may be sent to the pressure adjuster 72 (step S27), and the processing based on the target material output subroutine may be ended.

Through the processing described above, the pressure adjuster 72 may adjust the pressure within the target generator 71, which may result in the target material 270 not being outputted from the target generator 71.

After this, the target control apparatus 80B may, as shown in FIG. 5, determine whether or not a stop signal for the target generator 71 has been received from the EUV light generation controller 5 (step S4). This stop signal may be a signal for starting the hardening of the target material 270 within the target generator 71.

In the case where the target control apparatus 80B has determined that the stop signal has not been received in step S4, the processing of step S3 may be carried out. On the other hand, in the case where the target control apparatus 80B has determined that the stop signal has been received in step S4, processing based on the target material cooling subroutine may be carried out (step S5), and the process for generating EUV light may be ended. As a result of the processing indicated in step S5, the target material 270 that is melted within the target generator 71 may harden.

Specifically, the target control apparatus 80B, as shown in FIG. 9, may set, as a new target temperature T1*t*, a temperature obtained by subtracting a temperature ΔT from the target temperature T1*t* currently set in the first heater 91A. Likewise, the target control apparatus 80B may set, as new target temperatures T2*t* to T5*t*, temperatures obtained by subtracting the temperature ΔT from the target temperatures T2*t* to T5*t*, respectively, set in the second through fifth heaters 92A to 95A (step S31). This temperature ΔT may, for example, be any temperature within a range from greater than or equal to 5° C. and less than or equal to 10° C.

Next, the target control apparatus 80B may set the new target temperatures T1*t* to T5*t* in the first through fifth temperature controllers 971B to 975B (step S32). When the processing of step S32 is carried out, the amounts of heat emitted by the first through fifth heaters 91A to 95A may drop, and the temperature of the target material 270 may drop due to, for example, natural thermal release or the like.

The first through fifth heater temperature sensors 101B to 105B may then send signals corresponding to the detected temperatures to the first through fifth temperature controllers 971B to 975B, respectively. The first through fifth temperature controllers 971B to 975B may send the signals received from the first through fifth heater temperature sensors 101B to 105B to the target control apparatus 80B.

After this, the target control apparatus 80B may determine whether or not all of the conditions in the following Formulas (8) to (12) are met (step S33).

$$\Delta Tr11 \leq |T1t - T1| \quad (8)$$

$$\Delta Tr12 \leq |T2t - T2| \quad (9)$$

$$\Delta Tr13 \leq |T3t - T3| \quad (10)$$

$$\Delta Tr14 \leq |T4t - T4| \quad (11)$$

$$\Delta Tr15 \leq |T5t - T5| \quad (12)$$

ΔTr11, ΔTr12, ΔTr13, ΔTr14, ΔTr15: permissible ranges of temperature control as a result of control In other words, the target control apparatus 80B may determine whether or not the temperatures T1 to T5 detected by the first through fifth heater temperature sensors 101B to 105B are essentially the same as the target temperatures T1*t* to T5*t*.

Here, the permissible ranges ΔTr11 to ΔTr15 may be any temperature within a range from greater than or equal to 1° C. and less than or equal to 3° C. Meanwhile, the permissible ranges ΔTr11 to ΔTr15 may be the same as each other, or may be different. Furthermore, the permissible ranges ΔTr11 to ΔTr15 may be the same as any of the aforementioned ΔTr1 to ΔTr5, or may be different.

In the case where the target control apparatus 80B has determined in step S33 that at least one of the conditions of Formulas (8) to (12) has not been met, the processing of step S33 may be carried out once again after a predetermined amount of time has passed. On the other hand, in the case where the target control apparatus 80B has determined in step S33 that all of the conditions of Formulas (8) to (12) are met, it may be determined whether or not the temperature T1 detected by the first heater temperature sensor 101B is less than the melting point Tm of the target material 270 (step S34). In other words, the target control apparatus 80B may determine whether or not the temperature T1 of the target material 270 held in the leading end of the nozzle 712 is less than the melting point Tm.

The temperature T1 surrounding the area of the target material 270 contained in the target generator 71 whose temperature is the highest being less than the melting point Tm may mean that the temperature of the target material 270 as a whole is less than the melting point Tm. In this case, it may be determined that the target material 270 as a whole has hardened.

In the case where the target control apparatus 80B has determined that the temperature T1 is not less than the melting point Tm in step S34, the processing of step S31 may be carried out. The target temperatures T1*t* to T5*t* may gradually decrease by repeating the processes from step S31 to step S34. Then, the target material 270 may be cooled while maintaining the state in which the temperature is higher toward the leading end of the nozzle 712.

On the other hand, in the case where the target control apparatus 80B has determined that the temperature T1 is less than the melting point Tm, the first through fifth heaters 91A to 95A may be stopped by controlling the first through fifth temperature controllers 971B to 975B (step S35). The processing based on the target material cooling subroutine may then be ended.

Through the aforementioned processing, the target material 270 may be hardened in sequence from the side toward the upper end of the tank 711.

As described above, the first through fifth heater temperature sensors 101B to 105B may detect the temperatures T1 to T5 at the areas of the target material 270 within the target generator 71 that are heated by the first through fifth heaters 91A to 95A, respectively. The temperature distribution control unit 96B may control the first through fifth heaters 91A to 95A based on the temperatures T1 to T5 detected by the first through fifth heater temperature sensors 101B to 105B.

Through such a configuration, the temperatures of the first through fifth heaters 91A to 95A can be controlled in steps based on the temperature of the target material 270, and thus the temperature of the target material 270 may be adjusted appropriately. For example, the target supply apparatus 7B can reduce the target temperatures T1*t* to T5*t* in steps, and may therefore suppress sudden cooling of the target material 270 more than in the case where the first through fifth heaters 91A to 95A are stopped simultaneously. Accordingly, the separation and buildup of oxidants at the leading end of the nozzle 712 may be suppressed. Furthermore, the target supply apparatus 7B can detect that all of the target material 270 has melted, and thus the generation of EUV light may be commenced at an appropriate timing. Further still, the target supply apparatus 7B can detect that all of the target material 270 has hardened, and thus the first through fifth heaters 91A to 95A may be stopped at an appropriate timing.

3.4 Third Embodiment

3.4.1 Overview

According to a third embodiment of the present disclosure, a target supply apparatus may include a heater and a low heating unit provided in a position within a target generator that is distanced from the inner walls of the target generator. The target supply apparatus may control the heater and the low heating unit so that the temperature of a target material within the target generator decreases progressing away from the inner walls of the target generator.

According to such a configuration, the buildup of oxidants from the target material on the inner walls of the target generator may be suppressed.

3.4.2 Configuration

Figure 10:
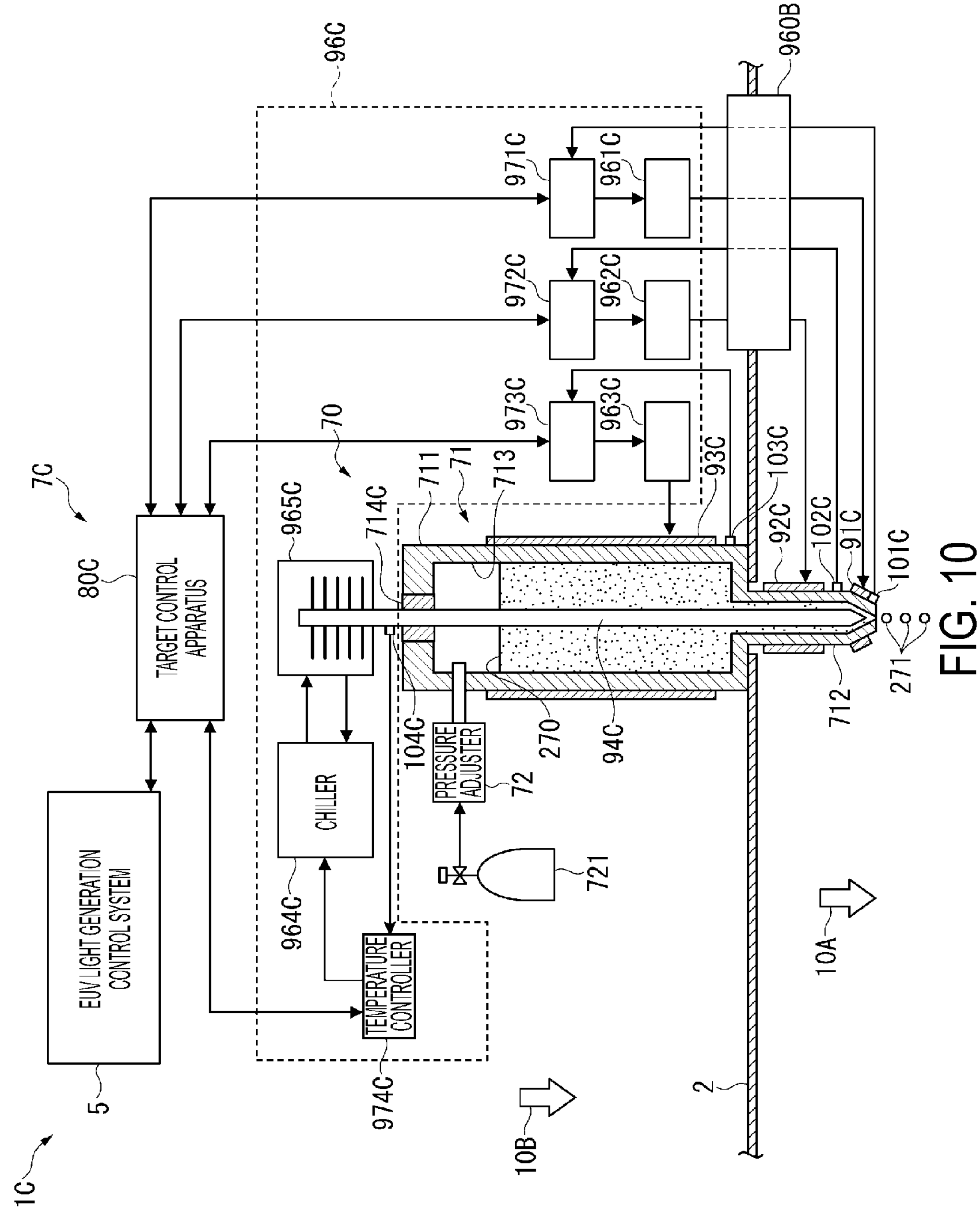
FIG. 10 illustrates the overall configuration of an EUV light generation apparatus in which a target supply apparatus according to a third embodiment is applied.

FIG. 10 illustrates the overall configuration of an EUV light generation apparatus in which a target supply apparatus according to a third embodiment is applied. Note that the configurations of other parts of the EUV light generation apparatus may be the same as those illustrated in FIG. 2.

The differences between a target supply apparatus 7C that partially configures an EUV light generation apparatus 1C according to the third embodiment and the target supply apparatus 7B of the second embodiment may, as shown in FIG. 10, be that the configuration of a target control apparatus 80C and a temperature distribution control unit 96C are different; that a first heater temperature sensor 101C, a second heater temperature sensor 102C, and a third heater temperature sensor 103C, collectively, first through third heater temperature sensors 101C to 103C, are provided instead of the first through fifth heater temperature sensors 101B to 105B; that a low heating unit temperature sensor 104C is provided; and that a first heater 91C, a second heater 92C, and a third heater 93C, collectively first through third heaters 91C to 93C, and a low heating unit 94C are provided instead of the first through fifth heaters 91A to 95A.

The target supply apparatus 7C may include the first through third heaters 91C to 93C, the low heating unit 94C, the temperature distribution control unit 96C serving as a control unit, the first through third heater temperature sensors 101C to 103C, and the low heating unit temperature sensor 104C.

The first and second heaters 91C and 92C may be provided in the same positions as the first and second heaters 91A and 92A, respectively, of the second embodiment. The third heater 93C may be provided in a position that includes the range in which the third through fifth heaters 93B to 95B are disposed in the second embodiment. The third heater 93C may be disposed so as to cover essentially the entire circumference of the inner wall of the tank 711.

The low heating unit 94C may be configured of a material that has favorable heat transfer properties and whose surface, at a minimum, does not easily react with the target material 270. The low heating unit 94C may be formed, for example, in a rod shape, of molybdenum or tungsten, which have favorable heat transfer properties. Alternatively, the low heating unit 94C may, for example, be a copper heat pipe whose surface has been coated with a material that does not react easily with the target material 270. In the case where the target material 270 is tin, the material with which the surface of the copper heat pipe is coated may be molybdenum or tungsten. In addition, the leading end of the low heating unit 94C may be positioned slightly higher than the leading end of the nozzle 712. A gap for outputting the target material 270 may be formed between the low heating unit 94C and the nozzle 712. The shape of the leading end of the low heating unit 94C may be a shape that conforms to the inner wall surface of the nozzle 712, or may be a shape that allows an approximately constant distance from the inner wall surface of the nozzle 712.

The low heating unit 94C may be positioned at approximately the center of the radial direction of the target generator 71 via an insulating portion 714C, provided passing through an upper surface plate of the tank 711. It is preferable for the insulating portion 714C to have a higher heat transfer coefficient than the upper surface plate of the tank 711. By providing the low heating unit 94C via the insulating portion 714C, thermal conductivity between the low heating unit 94C and the target generator 71 may be suppressed.

Because the low heating unit 94C has favorable heat transfer properties, the temperature of the low heating unit 94C may become essentially the same as the temperature of the target material 270 that makes contact with the low heating unit 94C, or in other words, as the temperature of the target material 270 positioned in approximately the center of the radial direction of the target generator 71.

The third heater temperature sensor 103C may be provided lower than the third heater 93C in the tank 711, and may be electrically connected to a third temperature controller 973C in the temperature distribution control unit 96C. The third heater temperature sensor 103C may detect a temperature of the tank 711, and may send that temperature to the third temperature controller 973C as a signal corresponding to the detected temperature indicating the temperature of the target material 270 contained in the tank 711.

The low heating unit temperature sensor 104C may be provided on an area of the low heating unit 94C that is exposed from the target generator 71, and may be electrically connected to a low heating unit temperature controller 974C in the temperature distribution control unit 96C. The low heating unit temperature sensor 104C may detect a temperature of the low heating unit 94C. That temperature may be sent to the low heating unit temperature controller 974C as a signal corresponding to the detected temperature, indicating the temperature of the target material 270 located in approximately the center of the radial direction of the target generator 71.

The temperature distribution control unit 96C may include first through third heater power sources 961C to 963C (a first heater power source 961C, a second heater power source 962C, and a third heater power source 963C), a chiller 964C, a heat exchanger 965C, a first temperature controller 971C, a second temperature controller 972C, a third temperature controller 973C, and the low heating unit temperature controller 974C.

The first through third heater power sources 961C to 963C may be electrically connected to the first through third heaters 91C to 93C and the first through third temperature controllers 971C to 973C, respectively. The first through third heater power sources 961C to 963C may respectively cause the first through third heaters 91C to 93C to emit heat based on signals from the first through third temperature controllers 971C to 973C, respectively.

The first through third temperature controllers 971C to 973C may be electrically connected to the target control apparatus 80C. The first through third temperature controllers 971C to 973C may detect a temperature of the tank 711 based on signals from the first through third heater temperature sensors 101C to 103C, and may send signals for controlling the temperatures of the respective heaters to the first through third heaters 91C to 93C, respectively.

The heat exchanger 965C may be provided at an upper end of the low heating unit 94C.

The chiller 964C may be connected to the heat exchanger 965C via a pipe. In addition, the chiller 964C may be electrically connected to the low heating unit temperature controller 974C. The chiller 964C may circulate a thermal medium with the heat exchanger 965C via the pipe. Through this, the low heating unit 94C may heat the target material 270. The thermal medium may be a medium that is stable even at temperatures greater than or equal to the melting point of the target material 270. For example, the thermal medium may be oil.

The low heating unit temperature controller 974C may be electrically connected to the target control apparatus 80C. The low heating unit temperature controller 974C may detect a temperature of the target material 270 that is in contact with the low heating unit 94C based on a signal from the low heating unit temperature sensor 104C. Then, the low heating unit temperature controller 974C may send, to the chiller 964C, a signal for applying a temperature gradient in the radial direction to the target material 270.

Here, a target temperature of the low heating unit 94C set by the low heating unit temperature controller 974C may be set to be lower than target temperatures for the first through third heaters 91C to 93C. Accordingly, the target material 270 may be heated at a high temperature from the outer side of the radial direction of the target generator 71, and may be heated at a lower temperature than the outer side in the center of the radial direction of the target generator 71. As a result, the target material 270 located in approximately the center of the radial direction of the target generator 71 may be kept at a relatively lower temperature than the target material 270 located on the outer side of the radial direction. In other words, the low heating unit 94C may heat the target material 270 at a lower temperature than the first through third heaters 91C to 93C.

3.4.3 Operation

Figure 11:
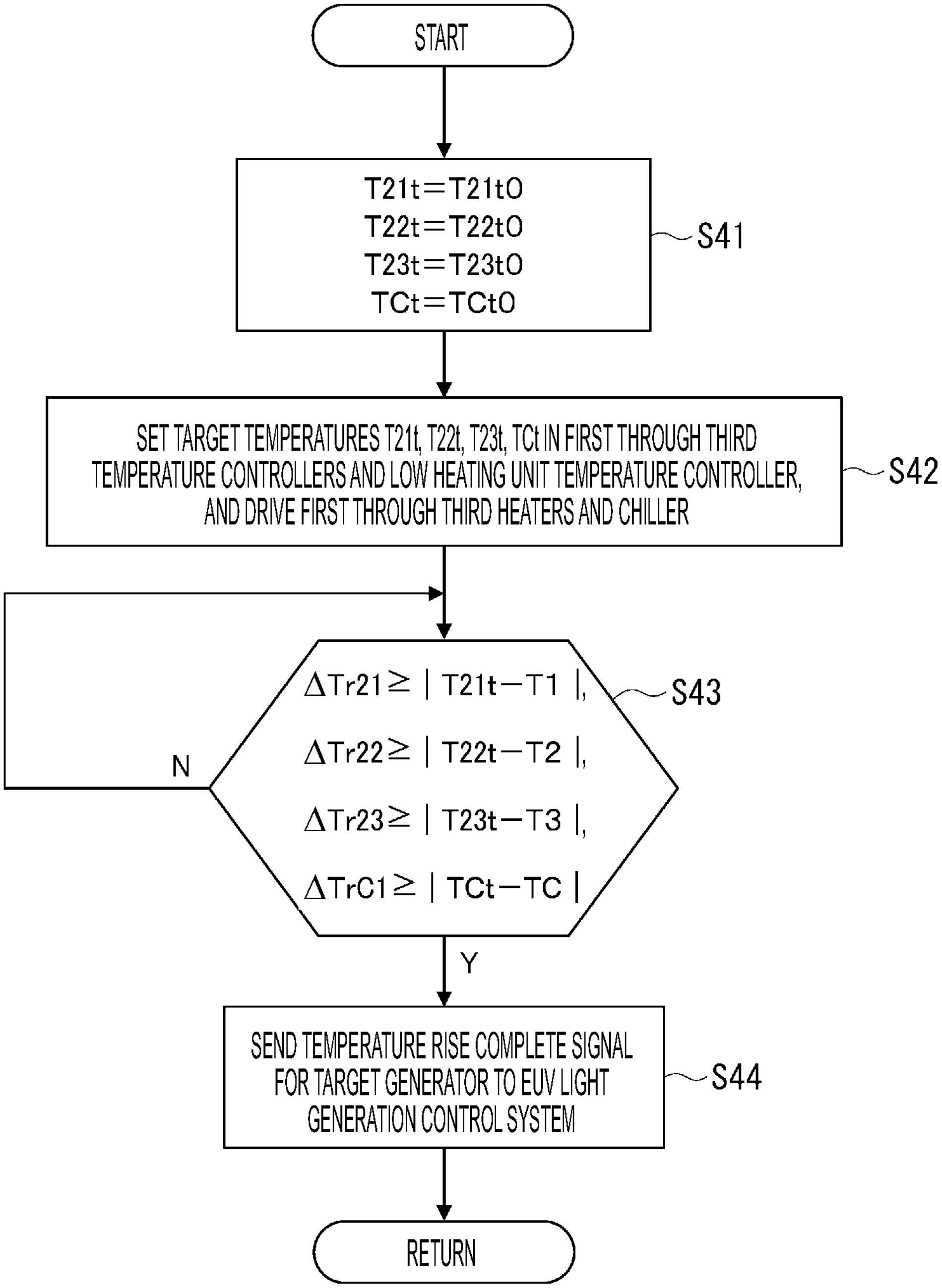
FIG. 11 is a flowchart illustrating a target material heating subroutine.
Figure 12:
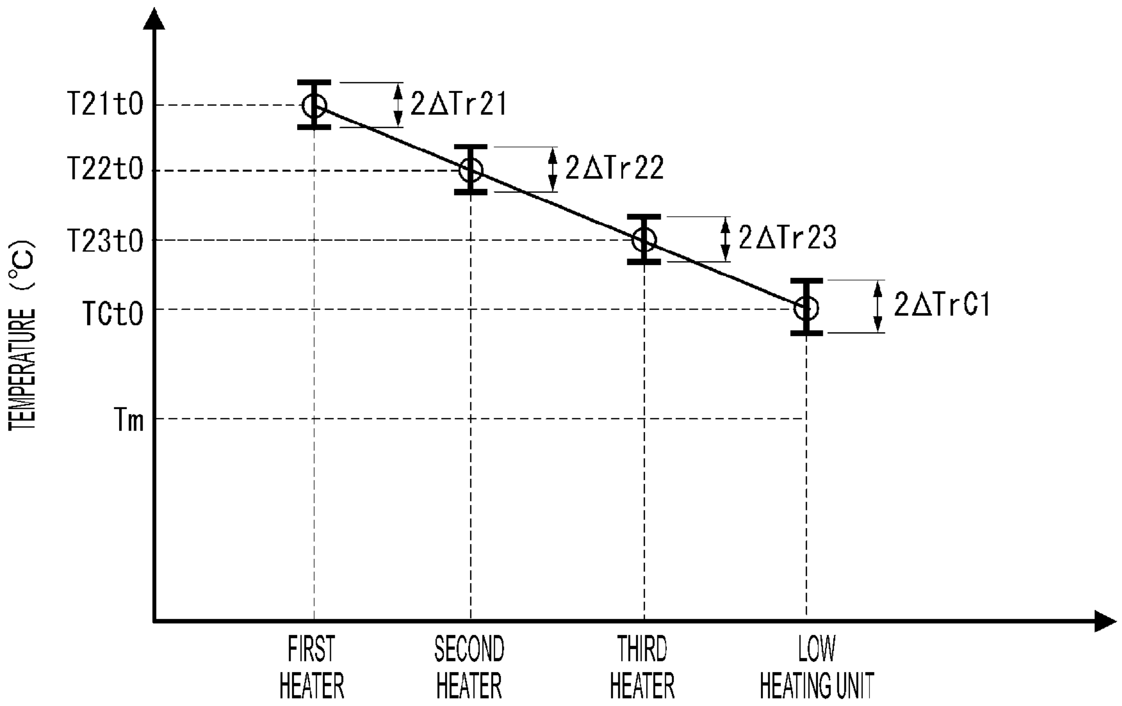
FIG. 12 illustrates target temperatures for first through third heaters and a low heating unit in graphical form.
Figure 13:
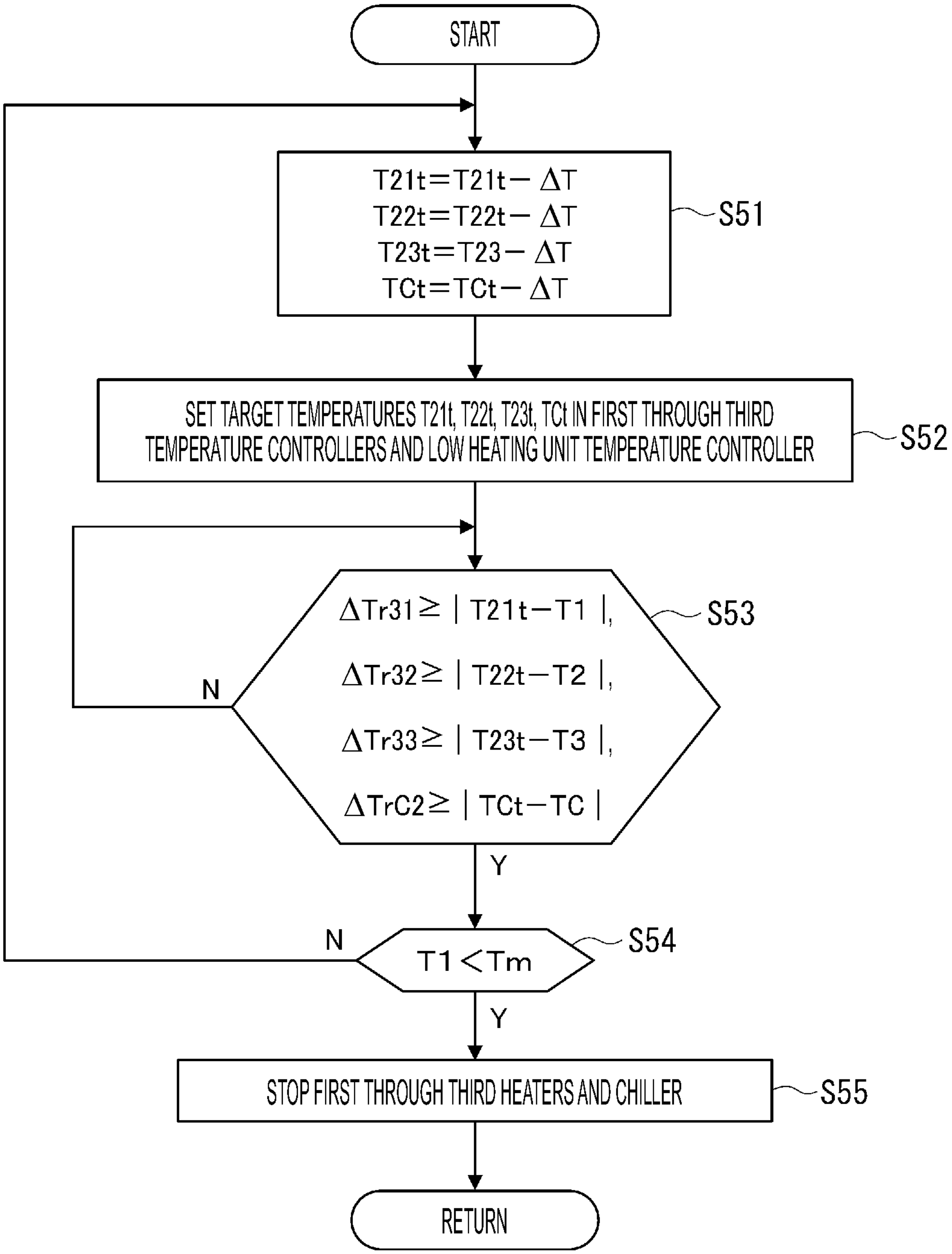
FIG. 13 is a flowchart illustrating a target material cooling subroutine.

FIG. 11 is a flowchart illustrating a target material heating subroutine. FIG. 12 illustrates the target temperatures for the first through third heaters and the low heating unit in graphical form. FIG. 13 is a flowchart illustrating a target material cooling subroutine.

The same processes as in the second embodiment, indicated in FIG. 5 and FIG. 8, may be carried out as the EUV light generation process and the target material output subroutine in the third embodiment.

In the third embodiment, in step S2 of FIG. 5, processing based on the target material heating subroutine shown in FIG. 11 may be carried out.

Specifically, the target control apparatus 80C may, as shown in FIG. 11, set respective target temperatures T21*t* to T23*t* (T21*t*, T22*t*, and T23*t*) and TCt of the first through third heaters 91C to 93C and the low heating unit 94C to temperatures T21*t*0 to T23*t*0 (T21*t*0, T22*t*0, and T23*t*0) and TCt0, respectively (step S41). The temperatures T21*t*0 to T23*t*0 and TCt0 may, as indicated in FIG. 12, have the temperature T21*t*0 as the highest temperature and the temperature TCt0 as the lowest temperature. In addition, the temperatures T21*t*0 to T23*t*0 and TCt0 may be greater than or equal to the melting point Tm of the target material 270. A temperature difference between the respective temperatures T21*t*0 to T23*t*0 and TCt0 may, for example, be approximately 10° C. For example, the temperatures T21*t*0, T22*t*0, T23*t*0, and TCt0 may be 370° C., 360° C., 350° C., and 340° C., respectively.

Next, the target control apparatus 80C may, as shown in FIG. 11, set the target temperatures T21*t* to T23*t* and TCt in the first through third temperature controllers and low heating unit temperature controller 971C to 974C, and may drive the first through third heaters 91C to 93C and the chiller 964C (step S42).

Due to the processing of step S42, the first through third heaters 91C to 93C may heat the target material 270 within the target generator 71 so that the temperature increases toward the leading end of the nozzle 712. On the other hand, the low heating unit 94C may, by driving the chiller 964C, slightly heat the target material 270 within the target generator 71 so that the temperature of the target material 270 drops in a direction progressing away from an inner wall 713 of the target generator 71. By driving the first through third heaters 91C to 93C and the chiller 964C in this manner, a temperature gradient in the axial direction and a temperature gradient in the radial direction may be applied to the target material 270.

The first through third heater temperature sensors and low heating unit temperature sensor 101C to 104C may respectively detect temperatures at the areas of the tank 711 heated by the first through third heaters 91C to 93C and a temperature of the target material 270 slightly heated by the low heating unit 94C. The first through third heater temperature sensors and the low heating unit temperature sensor 101C to 104C may send, via the first through third heater temperature controllers and low heating unit temperature controller 971C to 974C, signals corresponding to the detected temperatures to the target control apparatus 80C.

After this, the target control apparatus 80C may determine whether or not all of the conditions in the following Formulas (13) to (16) are met, based on the signals received from the first through third heater temperature controllers and low heating unit temperature controller 971C to 974C (step S43).

$$\Delta Tr21 \leq |T21t - T1| \tag{13}$$

$$\Delta Tr22 \leq |T22t - T2| \tag{14}$$

$$\Delta Tr23 \leq |T23t - T3| \tag{15}$$

$$\Delta TrC1 \leq |TCt - TC| \tag{16}$$

T1: temperature detected by the first heater temperature sensor 101C

T2: temperature detected by the second heater temperature sensor 102C

T3: temperature detected by the third heater temperature sensor 103C

TC: temperature detected by the low heating unit temperature sensor 104C

ΔTr21, ΔTr22, ΔTr23, ΔTrC1: permissible ranges of control result of temperature control Here, the permissible ranges ΔTr21, ΔTr22, ΔTr23 and ΔTrC1 may, for example, be any temperature within a range from greater than or equal to 1° C. and less than or equal to 3° C. Meanwhile, the permissible ranges ΔTr21, ΔTr22, ΔTr23 and ΔTrC1 may be the same as each other, or may be different.

In the case where the target control apparatus 80C has determined in step S43 that at least one of the conditions of Formulas (13) to (16) has not been met, the processing of step S43 may be carried out once again after a predetermined amount of time has passed. On the other hand, in the case where the target control apparatus 80C has determined in step S43 that all of the conditions of Formulas (13) to (16) have been met, a temperature rise complete signal may be sent to the EUV light generation controller 5 (step S44), and the processing based on the target material heating subroutine may end. In other words, the target control apparatus 80C may send the temperature rise complete signal in the case where it has been determined that the temperatures T1 to T3 and TC detected by the first through third heater temperature sensors and low heating unit temperature sensor 101C to 104C have become essentially equal to the target temperatures T21*t* to T23*t* and TCt.

Through the stated processing, the target material 270 may gradually melt from the leading end side of the nozzle 712 and from the outer sides in the radial direction.

The target control apparatus 80C may, after sending the temperature rise complete signal, carry out processing based on the target material output subroutine as shown in FIG. 5 in step S3, and may generate EUV light. Specifically, the target control apparatus 80C may carry out processing such as that shown in FIG. 8. Note that the target control apparatus 80C may continue to perform control for applying a temperature gradient in the axial direction and a temperature gradient in the radial direction to the target material 270 in the target generator 71 while the processing in step S3 is being carried out.

After this, in the case where the target control apparatus 80C has determined in step S4 that a stop signal for commencing the hardening of the target material 270 within the target generator 71 has been received, processing based on the target material cooling subroutine indicated in step S5 may be carried out (step S5), and the EUV light generation process may be ended. In the third embodiment, processing based on the target material cooling subroutine shown in FIG. 13 may be carried out as the processing in step S5.

Specifically, the target control apparatus 80C may, as shown in FIG. 13, set, as new target temperatures T21*t* to T23*t* and TCt, temperatures obtained by subtracting a temperature ΔT from the target temperatures T21*t* to T23*t* and TCt currently set in the first through third heaters 91C to 93C and the low heating unit 94C (step S51). In this embodiment, temperature ΔT may, for example, be any temperature within a range from greater than or equal to 5° C. and less than or equal to 10° C.

Next, the target control apparatus 80C may set the new target temperatures T21*t* to T23*t* and TCt in the first through third heater and low heating unit temperature controllers 971C to 974C (step S52), and may reduce the amount of heat emitted by the first through third heaters 91C to 93C and the low heating unit 94C.

The first through third heater and low heating unit temperature sensors 101C to 104C may then send signals corresponding to the detected temperatures to the target control apparatus 80C via the first through third heater and low heating unit temperature controllers 971C to 974C.

After this, the target control apparatus 80C may determine whether or not all of the conditions in the following Formulas (17) to (20) are met (step S53).

$$\Delta Tr31 \leq |T21t - T1| \tag{17}$$

$$\Delta Tr32 \leq |T22t - T2| \tag{18}$$

$$\Delta Tr33 \leq |T23t - T3| \tag{19}$$

$$\Delta TrC2 \leq |TCt - TC| \tag{20}$$

ΔTr31, ΔTr32, ΔTr33, ΔTrC2: permissible ranges of control result of temperature control In other words, the target control apparatus 80C may determine whether or not the temperatures T1 to T3 and TC detected by the first through third heater and low heating unit temperature sensors 101C to 104C have become essentially equal to the target temperatures T21*t* to T23*t* and TCt.

Here, the permissible ranges ΔTr31 to ΔTr33 and ΔTrC2 may, for example, be any temperature within a range from greater than or equal to 1° C. and less than or equal to 3° C. Meanwhile, the permissible ranges ΔTr31 to ΔTr33 and ΔTrC2 may be the same as each other, or may be different. Furthermore, the permissible ranges ΔTr31 to ΔTr33 and $\Delta TrC2$ may be the same as the permissible ranges $\Delta Tr21$ to $\Delta Tr23$ and $\Delta TrC1$, or may be different.

In the case where the target control apparatus 80C has determined in step S53 that at least one of the conditions of Formulas (17) to (20) has not been met, the processing of step S53 may be carried out once again after a predetermined amount of time has passed. On the other hand, in the case where the target control apparatus 80C has determined in step S53 that all of the stated conditions are met, it may be determined whether or not the temperature T1 detected by the first heater temperature sensor 101C is less than the melting point Tm of the target material 270 (step S54). In the case where the conditions in step S54 are met, it may be determined that the target material 270 as a whole has hardened.

In the case where the target control apparatus 80C has determined that the temperature T1 is not less than the melting point Tm in step S54, the processing of step S51 may be carried out. By repeating the processes of step S51 through step S54, the target temperatures T21*t* to T23*t* and TCt may gradually drop, and the target material 270 may be slightly heated while maintaining a state in which the temperature is higher toward the leading end of the nozzle 712 than toward the other end of the nozzle 712 and while maintaining a state in which the temperature of the target material is lower further from the inner wall 713 than closer to the inner wall 713.

On the other hand, in the case where the target control apparatus 80C has determined that the temperature T1 is less than the melting point Tm, the first through third heaters 91C to 93C and the low heating unit 94C may be stopped (step S55). The processing based on the target material cooling subroutine may then be ended.

Through the aforementioned processing, the target material 270 may be hardened gradually from the side toward the upper end of the tank 711 and from the center of the radial direction of the target generator 71.

As described above, the temperature distribution control unit 96C of the target supply apparatus 7C may control the first through third heaters 91C to 93C and the low heating unit 94C so as to apply a temperature gradient in the radial direction to the target material 270 within the target generator 71.

As a result, the buildup of oxidants from the target material 270 on the inner wall 713 may be suppressed.

Furthermore, the temperature distribution control unit 96C may control the first through third heaters 91C to 93C and the low heating unit 94C based on the temperatures T1 to T3 and TC detected by the first through third heater and low heating unit temperature sensors 101C to 104C.

As a result, the same effects as in the second embodiment may be achieved.

Note that the target temperatures T21*t* to T23*t* may be the same as long as they are higher than the target temperature TCt. In this case, only a temperature gradient in the radial direction may be applied to the target material 270.

3.5 Fourth Embodiment

3.5.1 Overview

According to a fourth embodiment of the present disclosure, in an EUV light generation apparatus configured so that droplets are produced on demand, or in an EUV light generation apparatus configured so that a jet is generated as a continuous jet, a plurality of heaters may be controlled so that the temperature of a target material is higher toward the leading end of a nozzle than toward the other end of the nozzle.

Accordingly, the separation of oxidants from the target material near the nozzle of the target generator may be suppressed, and the likelihood that oxidants will clog the nozzle hole may be reduced. Further still, the likelihood that oxidants will separate in the nozzle hole may be reduced, and as a result, changes in the output direction of the target material may be suppressed.

3.5.2 Configuration

Figure 14:
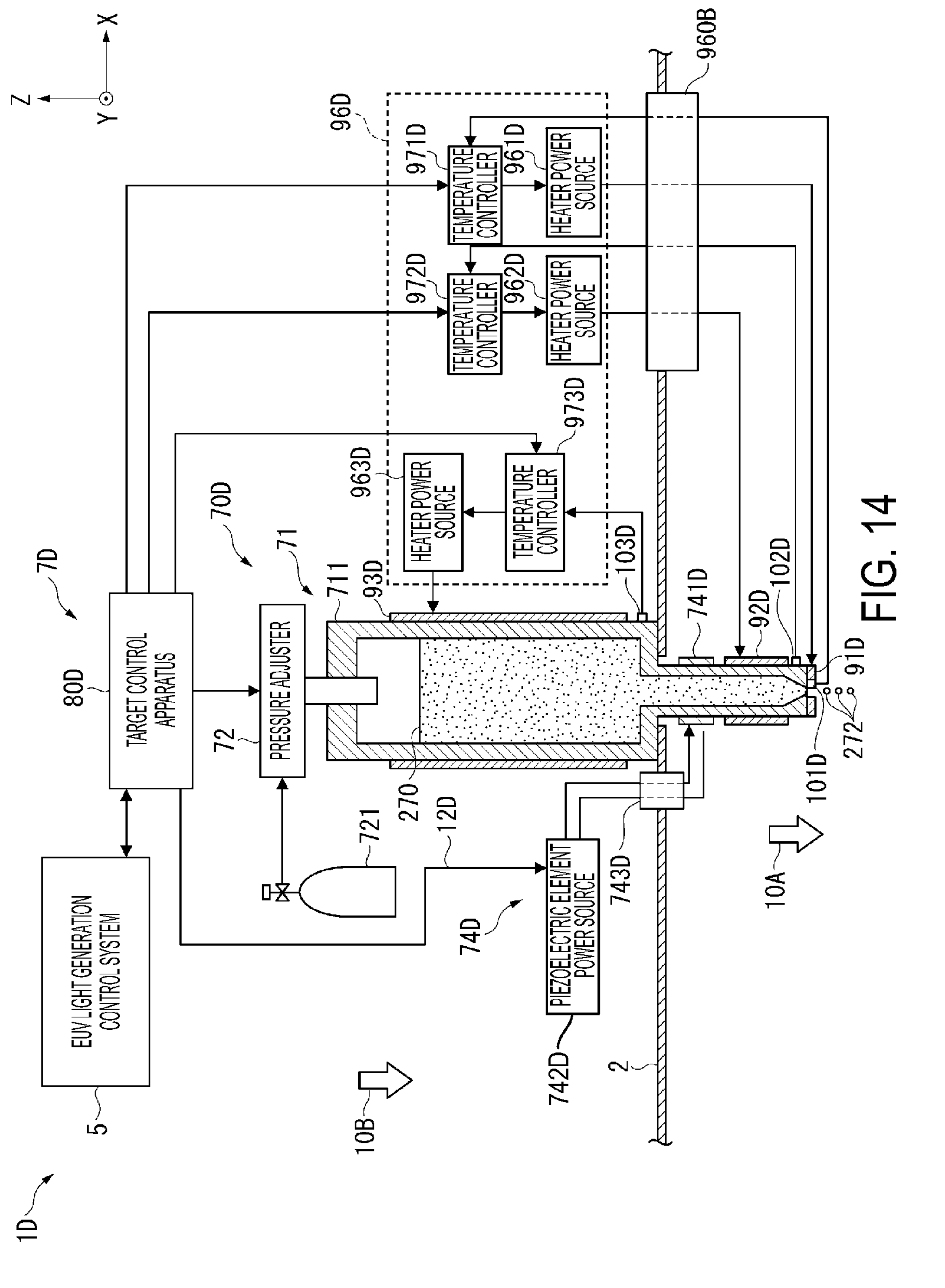
FIG. 14 illustrates the overall configuration of an EUV light generation apparatus in which a target supply apparatus according to a fourth embodiment is applied, and illustrates an on-demand system for generating droplets.
Figure 15:
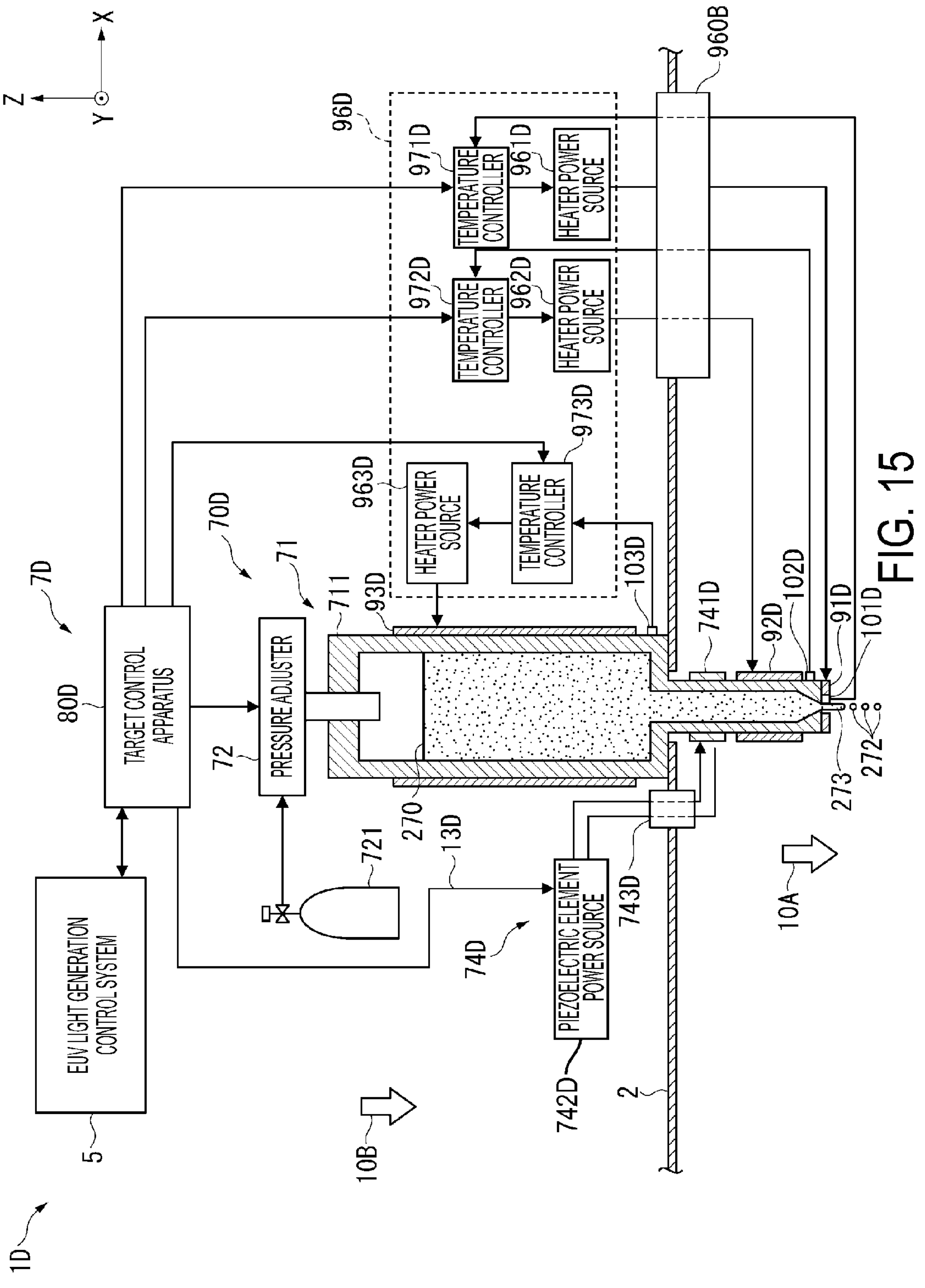
FIG. 15 illustrates the overall configuration of the EUV light generation apparatus in which the target supply apparatus according to the fourth embodiment is applied, and illustrates a continuous jet system for generating a jet.

FIG. 14 illustrates the overall configuration of part of an EUV light generation apparatus in which a target supply apparatus according to the fourth embodiment is applied, and illustrates an on-demand system for generating droplets. FIG. 15 illustrates the overall configuration of the EUV light generation apparatus in which the target supply apparatus according to the fourth embodiment is applied, and illustrates a continuous jet system for generating a jet. Note that in FIGS. 14 and 15, the configurations of other parts of the EUV light generation apparatus may be the same as those illustrated in FIG. 2.

The differences between a target supply apparatus 7D that partially configures an EUV light generation apparatus 1D according to the fourth embodiment and the target supply apparatus 7C of the third embodiment may, as shown in FIGS. 14 and 15, be that the configurations of a target generation unit 70D, a target control apparatus 80D, and a temperature distribution control unit 96D are different, and that the low heating unit 94C is not provided.

The target supply apparatus 7D may include the target generation unit 70D, a first heater 91D, a second heater 92D, and a third heater 93D, collectively, first through third heaters 91D to 93D, the temperature distribution control unit 96D serving as a control unit, and a first heater temperature sensor 101D, a second heater temperature sensor 102D, and a third heater temperature sensor 103D, collectively, first through third heater temperature sensors 101D to 103D.

The target generation unit 70D may include the target generator 71, the pressure adjuster 72, and a piezoelectric extrusion unit 74D. The piezoelectric extrusion unit 74D may include a piezoelectric element 741D and a piezoelectric element power source 742D. The piezoelectric element 741D may be provided within the chamber 2 and on the outer circumferential surface of the nozzle 712. Instead of the piezoelectric element 741D, a mechanism capable of applying a compressive force on the nozzle 712 at high speeds may be provided. The piezoelectric element power source 742D may be connected to the piezoelectric element 741D via a feedthrough 743D provided passing through a wall area of the chamber 2. The piezoelectric element power source 742D may be connected to the target control apparatus 80D.

The first through third heaters 91D to 93D and the first through third heater temperature sensors 101D to 103D may be provided in the same positions as the first through third heaters 91C to 93C and the first through third heater temperature sensors 101D to 103D, respectively, in the third embodiment.

The temperature distribution control unit 96D may include a first heater power source 961D, a second heater power source 962D, and a third heater power source 963D, collectively, first through third heater power sources 961D to 963D and the first temperature controller 971D, the second temperature controller 972D, and the third temperature controller 973D, collectively, the first through third temperature controllers 971D to 973D, which have the same respective functions as the first through third heater power sources 961C to 963C and the first through third temperature controllers 971C to 973C according to the second embodiment.

3.5.3 Operation

The target control apparatus 80D may heat the target material 270 within the target generator 71 so as to apply a temperature gradient in the axial direction and gradually melt the target material 270 from the leading end side of the nozzle 712, through the same processing as the processing illustrated in FIG. 5 to FIG. 9. Meanwhile, the target control apparatus 80D may gradually harden the target material 270 from the upper end side of the tank 711 by allowing the heat to dissipate from the target material 270 while maintaining a state in which the temperature is higher toward the leading end of the nozzle 712 than toward the other end of the nozzle 712.

In addition, the configuration may be such that during the EUV light generation in step S3 shown in FIG. 5, the target control apparatus 80D adjusts the pressure within the tank 711 to a predetermined pressure by sending a signal to the pressure adjuster 72. This predetermined pressure may be a pressure of a magnitude that forms a meniscus, for example, a spherical convex surface, in the target material 270 at the nozzle hole, and a droplet 272 may not be outputted in this state.

After this, the target control apparatus 80D may, as shown in FIG. 14, send a droplet generation signal 12D to the piezoelectric element power source 742D in order to generate droplets 272 on demand. Having received the droplet generation signal 12D, the piezoelectric element power source 742D may supply predetermined pulsed electrical power to the piezoelectric element 741D.

Having been supplied with electrical power, the piezoelectric element 741D may deform in accordance with the timing of the electrical power supply. As a result, the nozzle 712 may be compressed at a high speed, and the droplets 272 may be outputted as a result. If the predetermined pressure is maintained within the tank 711, the droplets 272 may be outputted in accordance with the timing of the electrical power supply. Then, the target material 270 may once again form a meniscus in the nozzle hole due to the predetermined pressure immediately after a droplet 272 has been outputted.

As shown in FIG. 15, the target control apparatus 80D may be configured so as to adjust the pressure in the tank 711 so that a jet 273 is generated as a continuous jet. The pressure within the tank 711 at this time may be a higher pressure than the predetermined pressure mentioned above.

Then, the target control apparatus 80D may send a vibration signal 13D to the piezoelectric element power source 742D in order to generate the droplets 272. Having received the vibration signal 13D, the piezoelectric element power source 742D may supply electrical power to cause the piezoelectric element 741D to vibrate.

Having been supplied with electrical power, the piezoelectric element 741D may cause the nozzle 712 to vibrate at a high speed. Through this, the jet 273 is interrupted at a constant cycle, and is thus outputted as the droplets 272. EUV light may be generated by irradiating the droplets 272 outputted in this manner with the pulsed laser beam.

As described above, according to the target supply apparatus 7D, the first through third heaters 91D to 93D may be controlled so as to apply a temperature gradient in the axial direction to the target material 270, even in the case where the droplets 272 are generated on demand or as a continuous jet.

Accordingly, the separation of oxidants from the target material 270 near the nozzle 712 may be suppressed, and the likelihood that oxidants will clog the nozzle hole may be reduced. Furthermore, changes in the output direction of the droplets 272 may be suppressed by reducing the likelihood that oxidants will separate and accumulate at the nozzle hole.

Note that the low heating unit 94C, the low heating unit temperature sensor 104C, the chiller 964C, the heat exchanger 965C, and the low heating unit temperature controller 974C of the third embodiment may be applied in the target supply apparatus 7D and a temperature gradient in the radial direction may be applied to the target material 270. In this case, temperature gradients in both the radial direction and the axial direction may be applied to the target material 270, or a temperature gradient in the radial direction only may be applied to the target material 270.

3.6 Fifth Embodiment 3.6.1 Overview

According to a fifth embodiment of the present disclosure, in an EUV light generation apparatus configured so that droplets are generated through electrostatic extraction, a plurality of heaters may be controlled so that the temperature of a target material is higher toward the leading end of a nozzle than toward the other end of the nozzle.

Accordingly, the separation of oxidants from the target material near the nozzle of the target generator may be suppressed, and the likelihood that oxidants will clog the nozzle hole may be reduced. Further still, the likelihood that oxidants will separate in the nozzle hole may be reduced, and as a result, changes in the output direction of the target material may be suppressed.

3.6.2 Configuration

Figure 16:
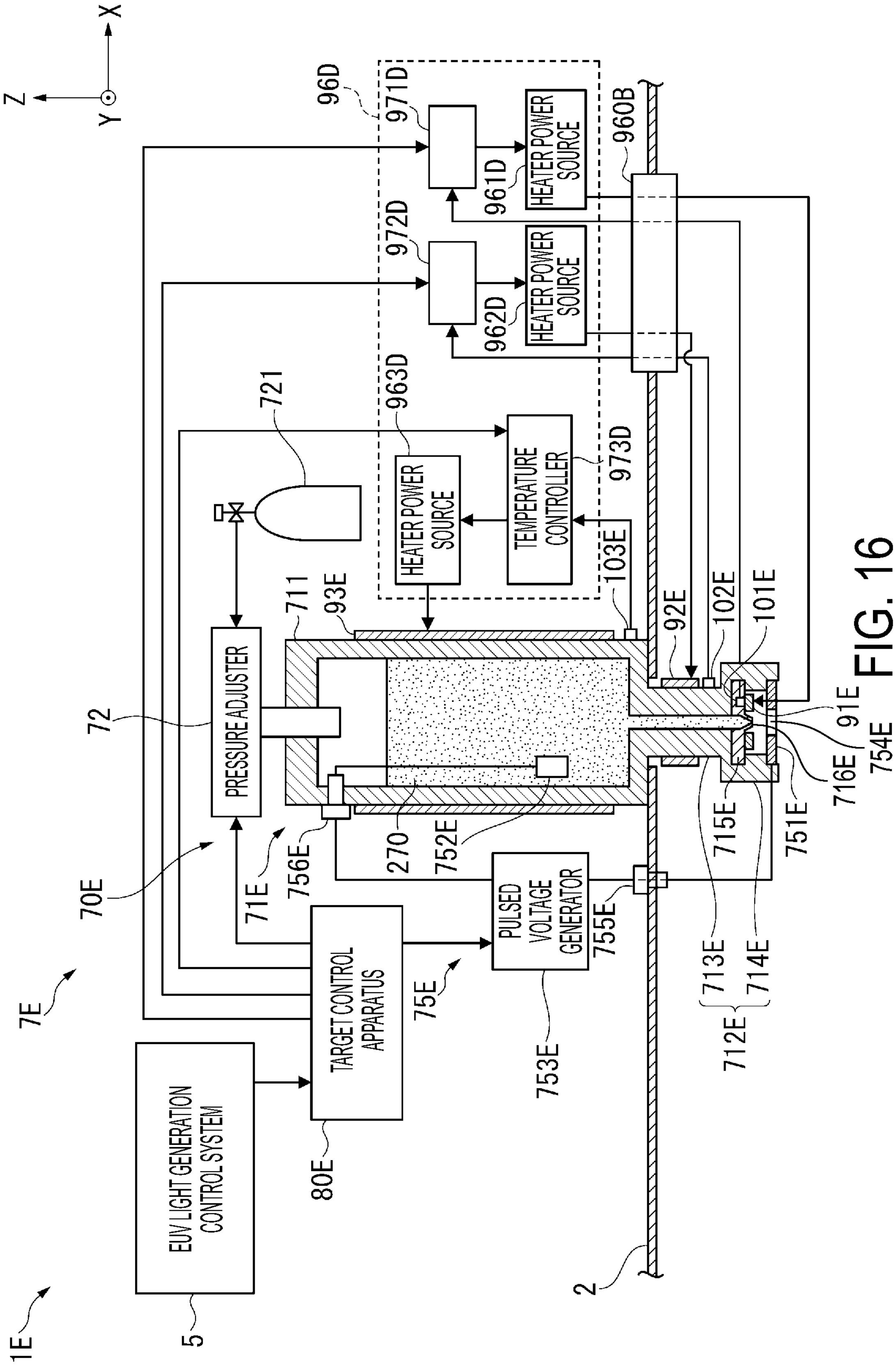
FIG. 16 illustrates the overall configuration of an EUV light generation apparatus in which a target supply apparatus according to a fifth embodiment is applied.

FIG. 16 illustrates the overall configuration of an EUV light generation apparatus in which is applied a target supply apparatus according to a fifth embodiment. The configurations of other parts of the EUV light generation apparatus may be the same as those illustrated in FIG. 2.

The differences between a target supply apparatus 7E that partially configures an EUV light generation apparatus 1E according to the fifth embodiment and the target supply apparatus 7D according to the fourth embodiment may, as shown in FIG. 16, be that the configurations of a target generation unit 70E and a target control apparatus 80E are different.

The target supply apparatus 7E may include the target generation unit 70E, first through third heaters 91E to 93E (a first heater 91E, a second heater 92E, and a third heater 93E), the temperature distribution control unit 96D, and a first heater temperature sensor 101E, a second heater temperature sensor 102E, and a third heater temperature sensor 103E, collectively, first through third heater temperature sensors 101E to 103E.

The target generation unit 70E may include a target generator 71E, the pressure adjuster 72, and an electrostatic extraction unit 75E.

The target generator 71E may include the tank 711 and a nozzle 712E. The nozzle 712E may include a nozzle main body 713E, a leading end holding portion 714E, and an output portion 715E. The nozzle main body 713E may be provided so as to protrude into the chamber 2 from the lower surface of the tank 711. The leading end holding portion 714E may be provided on the leading end of the nozzle main body 713E. The leading end holding portion 714E may be formed as a cylinder whose diameter is greater than that of the nozzle main body 713E. The leading end holding portion 714E may be configured as a separate entity from the nozzle main body 713E and may be anchored to the nozzle main body 713E.

The output portion 715E may be formed as an approximately circular plate. The output portion 715E may be held by the leading end holding portion 714E so as to be affixed to the leading end surface of the nozzle main body 713E. A circular cone-shaped protruding portion 716E that protrudes into the chamber 2 may be provided in a central area of the output portion 715E. The protruding portion 716E may be provided to make it easier for an electrical field to concentrate thereon. A nozzle hole may be provided in the protruding portion 716E, in approximately the center of a leading end portion that configures the upper surface of the circular cone in the protruding portion 716E. The nozzle hole may be a through-hole that enables the interior of the tank 711 to communicate with the interior of the chamber 2. It is preferable for the output portion 715E to be configured of a material that has a lower wettability relative to the output portion 715E than the target material 270. In the case where the output portion 715E is not configured of a material that has a lower wettability relative to the output portion 715E than the target material 270, at least the surface of the output portion 715E may be coated with the material that has a lower wettability.

The tank 711, the nozzle 712E, and the output portion 715E may be configured of electrically insulated materials. In the case where these elements are configured of materials that are not electrically insulated materials, for example, metal materials such as molybdenum or tungsten, an electrically insulated material may be disposed between the chamber 2 and the target generator 71E, between the output portion 715E and an extraction electrode 751E, or another arrangement. In this case, the tank 711 and a pulsed voltage generator 753E, mentioned later, may be electrically connected.

The electrostatic extraction unit 75E may include the extraction electrode 751E, an electrode 752E, and the pulsed voltage generator 753E. The extraction electrode 751E may be formed as an approximately circular plate. A circular through-hole 754E for allowing droplets to pass through may be formed in the center of the extraction electrode 751E. The extraction electrode 751E may be held by the leading end holding portion 714E so that a gap is formed between the extraction electrode 751E and the output portion 715E. It is preferable for the extraction electrode 751E to be held so that the center axis of the through-hole 754E and the axis of rotational symmetry of the circular cone-shaped protruding portion 716E match. The extraction electrode 751E may be connected to the pulsed voltage generator 753E via a feedthrough 755E.

The electrode 752E may be disposed in the target material 270 within the tank 711. The electrode 752E may be connected to the pulsed voltage generator 753E via a feedthrough 756E. The pulsed voltage generator 753E may be connected to the target control apparatus 80E. The pulsed voltage generator 753E may be configured to apply a voltage between the target material 270 within the tank 711 and the extraction electrode 751E. Through this, the target material 270 may be extracted in droplets due to static electricity.

The first heater 91E may be provided on the lower surface of the output portion 715E, surrounding the protruding portion 716E. The second heater 92E may be provided on the nozzle main body 713E in a position that is distanced from the leading end holding portion 714E. The third heater 93E may be provided in the same position as the third heater 93D of the fourth embodiment.

The first heater temperature sensor 101E may be provided so as to make contact with the output portion 715E. Preferably, the first heater temperature sensor 101E may be provided in a position within the output portion 715E that opposes the first heater 91E. The first heater temperature sensor 101E may detect a temperature of the output portion 715E. The second heater temperature sensor 102E may be provided on the nozzle main body 713E, between the second heater 92E and the leading end holding portion 714E. The third heater temperature sensor 103E may be provided in the same position as the third heater temperature sensor 103D of the fourth embodiment.

3.6.3 Operation

The target control apparatus 80E may heat the target material 270 within the target generator 71E so that the temperature toward the leading end of the nozzle 712E is greater than the temperature toward the other end of the nozzle 712E, through the same processing as the processing illustrated in FIG. 5 to FIG. 9, so as to gradually melt the target material 270 from the leading end side of the nozzle 712E. Meanwhile, the target control apparatus 80E may gradually harden the target material 270 from the upper end side of the tank 711 by allowing the heat to dissipate from the target material 270 while maintaining a state in which the temperature is higher toward the leading end of the nozzle 712E than toward the other end of the nozzle 712E.

As described thus far, even in the case where droplets are generated by a target supply apparatus 7E through so-called electrostatic extraction, the first through third heaters 91E to 93E may be controlled so as to apply a temperature gradient in the axial direction to the target material 270.

Accordingly, the separation and buildup of oxidants from the target material 270 near the nozzle 712E may be suppressed, and the likelihood that oxidants will clog the nozzle hole may be reduced. Further still, the likelihood that oxidants will separate in the nozzle hole may be reduced, and as a result, changes in the output direction of the target material may be suppressed.

The low heating unit 94C, the low heating unit temperature sensor 104C, the chiller 964C, the heat exchanger 965C, and the low heating unit temperature controller 974C of the third embodiment may be applied in the target supply apparatus 7E and a temperature gradient in the radial direction may be applied to the target material 270. In this case, temperature gradients in both the radial direction and the axial direction may be applied to the target material 270, or a temperature gradient in the radial direction only may be applied to the target material 270.

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

What is claimed is:

1. A target supply apparatus used in an extreme ultraviolet light apparatus that generates extreme ultraviolet light by irradiating a target with a laser beam, the target supply apparatus comprising:

a tank;

a nozzle that includes a through-hole and is disposed so that the through-hole communicates with an interior of the tank;

a first heater disposed along a wall of the tank;

a second heater disposed along a wall of the tank in a position that is further from the nozzle than the first heater;

a third heater configured to heat the nozzle; and a control unit configured to control the first heater, the second heater and the third heater so that a temperature of the first heater is greater than a temperature of the second heater and a temperature of the third heater is greater than the temperature of the first heater.

2. A target supply apparatus used in an extreme ultraviolet light apparatus that generates extreme ultraviolet light by irradiating a target with a laser beam, the target supply apparatus comprising:

a tank;

a nozzle that includes a through-hole and is disposed so that the through-hole communicates with an interior of the tank;

a first heater disposed along a wall of the tank;

a second heater configured to heat the nozzle;

a low heating unit provided within the tank and distanced from an inner wall of the tank; and a control unit configured to control the first heater, the second heater and the low heating unit so that a temperature of the first heater is greater than a temperature of the low heating unit and a temperature of the second heater is greater than the temperature of the first heater.

3. A target supply method used in an extreme ultraviolet light apparatus that generates extreme ultraviolet light by irradiating a target with a laser beam, the method using the target supply apparatus according to claim 1, and comprising any of:

a step of melting a target material by controlling the first heater, the second heater and the third heater such that the temperature of the first heater is higher than the temperature of the second heater and the temperature of the third heater is greater than the temperature of the first heater;

a step of holding a temperature of the target material within a predetermined temperature range by controlling the first heater, the second heater and the third heater such that the temperature of the first heater is higher than the temperature of the second heater and the temperature of the third heater is greater than the temperature of the first heater; and a step of hardening the target material by controlling the first heater, the second heater and the third heater such that the temperature of the first heater is higher than the temperature of the second heater and the temperature of the third heater is greater than the temperature of the first heater.

4. The target supply apparatus according to claim 1, further comprising a plurality of temperature sensors each associated with corresponding one of the first heater, the second heater and the third heater in the tank and the nozzle, wherein the control unit controls the first heater, the second heater and the third heater based on signals from the plurality of temperature sensors.

5. A target supply method used in an extreme ultraviolet light apparatus that generates extreme ultraviolet light by irradiating a target with a laser beam, the method using the target supply apparatus according to claim 4, and comprising:

a step of melting a target material by controlling the first heater, the second heater and the third heater based on a signal from the plurality of sensors such that the temperature of the first heater is higher than the temperature of the second heater and the temperature of the third heater is higher than the temperature of the first heater;

a step of holding a temperature of the target material within a predetermined temperature range by controlling the first heater, the second heater and the third heater based on signals from the plurality of sensors such that the temperature of the first heater is higher than the temperature of the second heater and the temperature of the third heater is higher than the temperature of the first heater; and a step of hardening the target material by controlling the first heater, the second heater and the third heater based on signals from the plurality of sensors such that the temperature of the first heater is higher than the temperature of the second heater and the temperature of the third heater is greater than the temperature of the first heater.

6. A target supply method used in an extreme ultraviolet light apparatus that generates extreme ultraviolet light by irradiating a target with a laser beam, the method using the target supply apparatus according to claim 2, and comprising:

a step of melting a target material by controlling the first heater, the second heater and the low heating unit such that the temperature of the first heater is higher than the temperature of the low heating unit and the temperature of the second heater is higher than the temperature of the first heater;

a step of holding a temperature of the target material within a predetermined temperature range by controlling the first heater, the second heater and the low heating unit such that the temperature of the first heater is higher than the temperature of the low heating unit and the temperature of the second heater is higher than the temperature of the first heater; and a step of hardening the target material by controlling the first heater, the second heater and the low heating unit such that the temperature of the first heater is higher than the temperature of the low heating unit and the temperature of the second heater is higher than the temperature of the first heater.

7. The target supply apparatus according to claim 2, further comprising a plurality of temperature sensors each associated with corresponding one of the first heater, the second heater and the low heating unit in the tank and the nozzle, wherein the control unit controls the first heater the second heater and the low heating unit based on signals from the plurality of temperature sensors.

8. A target supply method used in an extreme ultraviolet light apparatus that generates extreme ultraviolet light by irradiating a target with a laser beam, the method using the target supply apparatus according to claim 7, and comprising:

a step of melting a target material by controlling the first heater, the second heater and the low heating unit based on signals from the plurality of sensors such that the temperature of the first heater is higher than the temperature of the low heating unit and the temperature of the second heater is higher than the temperature of the first heater;

a step of holding a temperature of the target material within a predetermined temperature range by controlling the first heater, the second heater and the low heating unit based on signals from the plurality of sensors such that the temperature of the first heater is higher than the temperature of the low heating unit and the temperature of the second heater is higher than the temperature of the first heater; and a step of hardening the target material by controlling the first heater, the second heater and the low heating unit based on signals from the plurality of sensors such that the temperature of the first heater is higher than the temperature of the low heating unit and the temperature of the second heater is higher than the temperature of the first heater.

9. The target supply apparatus according to claim), wherein the third heater is disposed around the nozzle.

10. The target supply apparatus according to claim 9, wherein the third heater is disposed on an outer surface of the nozzle.

11. The target supply apparatus according to claim 10, wherein the third heater is disposed on the outer surface on a leading end side of the nozzle.

12. The target supply apparatus according to claim 2, wherein the second heater is disposed around the nozzle.

13. The target supply apparatus according to claim 12, wherein the second heater is disposed on an outer surface of the nozzle.

14. The target supply apparatus according to claim 13, wherein the second heater is disposed on the outer surface on a leading end side of the nozzle.

* * * * *